(12) United States Patent
Meyer

(10) Patent No.: US 7,791,487 B2
(45) Date of Patent: Sep. 7, 2010

(54) LOCATING RADIO FREQUENCY IDENTIFICATION TAGS IN TIME AND SPACE

(75) Inventor: Laurens Meyer, Richmond (AU)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/946,994

(22) Filed: Nov. 29, 2007

(65) Prior Publication Data

US 2009/0140841 A1 Jun. 4, 2009

(51) Int. Cl.
*G08B 13/14* (2006.01)
(52) U.S. Cl. ............... 340/572.4; 340/572.1; 340/10.1; 455/404.2
(58) Field of Classification Search ... 340/572.1–572.9, 340/10.1–10.4; 455/404.2, 403; 235/375–389
See application file for complete search history.

(56) References Cited

U.S. PATENT DOCUMENTS

| | | | | |
|---|---|---|---|---|
| 6,998,987 B2 * | 2/2006 | Lin | | 340/573.1 |
| 7,383,051 B2 * | 6/2008 | Spain et al. | | 455/456.1 |
| 2004/0105006 A1 | 6/2004 | Lazo et al. | | |
| 2005/0246094 A1 | 11/2005 | Moscatiello | | |
| 2006/0092015 A1 | 5/2006 | Agrawal et al. | | |
| 2006/0111961 A1 | 5/2006 | McQuivey | | |

OTHER PUBLICATIONS

Marinos, "RFID and the Value of Context: How a Disruptive Technology Promises Real-Time Intelligence", DM Review Magazine, May 2005, pp. 1-6.

* cited by examiner

*Primary Examiner*—George A Bugg
*Assistant Examiner*—Hongmin Fan
(74) *Attorney, Agent, or Firm*—Yee & Associates, P.C.; Ronald A. Kaschak

(57) ABSTRACT

Estimating a location of a RFID tag in time and space using incomplete data. A signal is received from an RFID tag at a plurality of receivers over a time range. At any particular time within the time range the signal is received at less than three receivers. The signal is generated at specific times within the time range. Receipt of the signal at a given receiver at a given time within the time range comprises an event. In this manner, a plurality of events arises during the time range. Additionally, corresponding locations of the plurality of receivers are known. The plurality of events is received at a data processing system. An algorithm is executed on the data processing system to process the plurality of events. An estimated location in time and space of the RFID tag is then generated with the algorithm and based on the plurality of events.

4 Claims, 17 Drawing Sheets

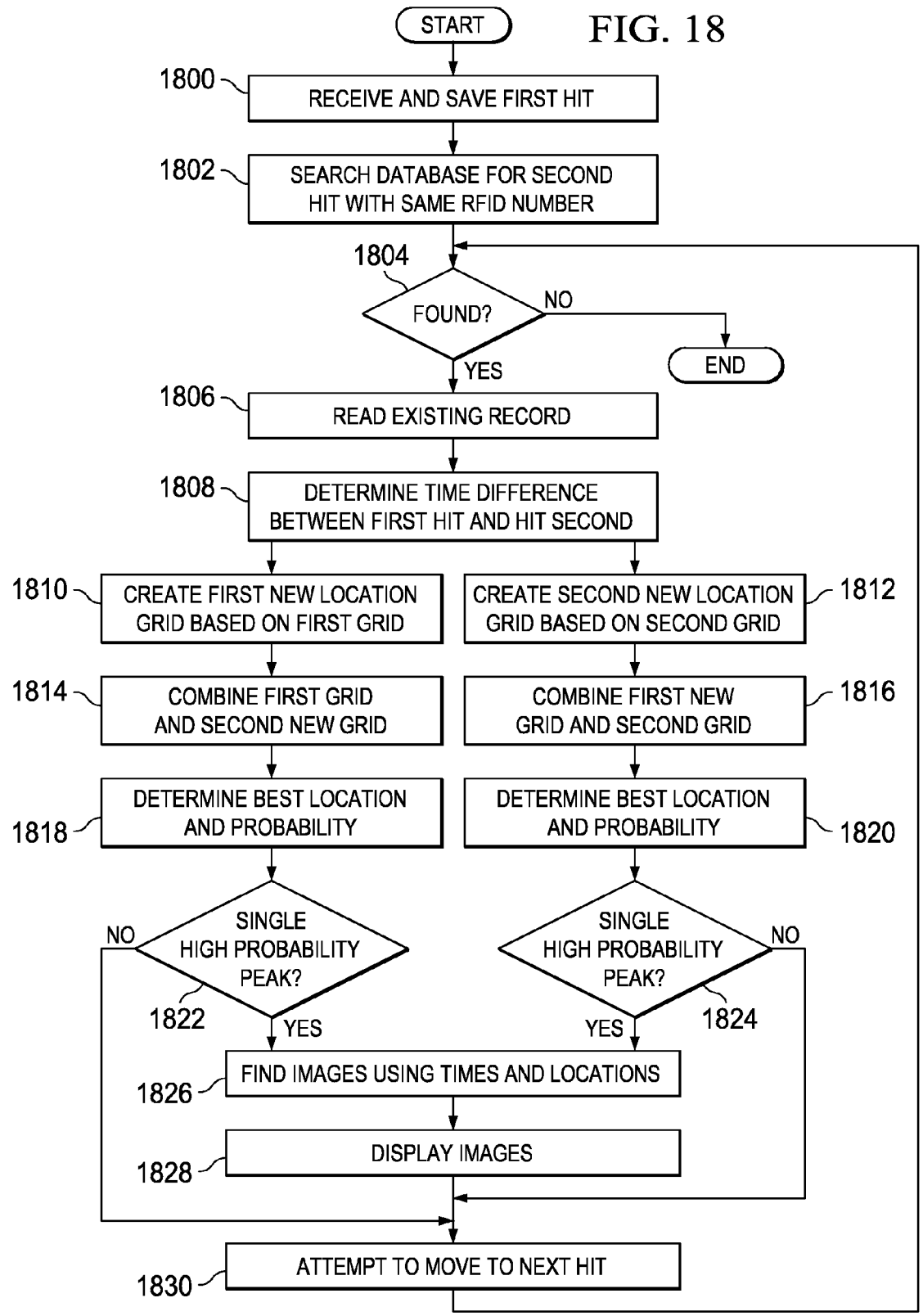

LOCATING RADIO FREQUENCY IDENTIFICATION TAGS IN TIME AND SPACE

BACKGROUND OF THE INVENTION

1. Field of the Invention

The present invention relates generally to an improved data processing system and in particular to using data processing systems for locating radio frequency identification tags in time and space. Still more particularly, the present invention relates using data processing systems to locating radio frequency identification tags in time and space when information is incomplete.

2. Description of the Related Art

Radio frequency identification tags (also known as RFID tags) have been used for years to track the location of objects in time and space. For example, a radio frequency identification tag can be physically attached to an object being used to manufacture an item, or to an article of manufacture itself as the article is being manufactured. The object or article of manufacture moves about the factory via machines, or is carried by hand, during the manufacturing process. Assuming that at least three radio receivers can read the signal produced by the radio frequency identification tag, the exact position of the radio frequency identification tag can be determined at any given time by using triangulation. The process of performing triangulation can be performed by a computer. In this manner, the position of an object in time and space can be determined. This RFID tag technique can also be used to track other objects outside the confines of a manufacturing setting.

However, a problem arises in tracking radio frequency identification tags if only incomplete information is available. For example, if only one or two receivers can detect the signal from the radio frequency identification tag, then triangulating the position of the radio frequency identification tag is impossible.

This problem can arise under many circumstances. For example, an object to which the radio frequency identification tag is attached may move into a zone through which a radio signal of sufficient power cannot be transmitted. In this case, the radio signal may be received by first and second receivers during a first time period, but only second and third receivers during a second time period. However, because at no time could the signal be received by all three receivers, triangulation cannot be used to determine the position of the radio frequency identification tag at any point. In this case, the only information available is that the signal from the radio frequency identification tag could be detected by first and second receivers during the first time period and by the second receiver and a third receiver during the second time period. This situation can also arise under other circumstances, such as when receivers are located far apart from each other relative to the signal strength generated by the radio frequency identification tag.

The above example shows a situation when incomplete information is available to determine a position of a radio frequency identification tag in time and space. Other situations and examples exist in which only incomplete information exists for making this determination.

SUMMARY OF THE INVENTION

The aspects of the present invention also provide for a computer implemented method, apparatus, and computer usable program code for estimating a location of a radio frequency identification tag using incomplete information. A plurality of signals is received from the radio frequency identification tag. Receiver information associated with the plurality of signals is insufficient to enable triangulation. A plurality of corresponding datasets is stored. Ones of the plurality of corresponding data sets correspond to ones of signals in the plurality of signals. Each corresponding dataset comprises a corresponding identifier for the radio frequency identification tag, a corresponding identifier of at least one corresponding receiver that received a corresponding signal, and a corresponding timestamp identifying a corresponding time at which the corresponding signal was received, so as to form a set of datasets for the radio frequency identification tag. Data in the set of datasets is used to calculate a time-correlated movement pattern for the radio frequency identification tag. The time-correlated movement pattern is used to estimate a location of the radio frequency identification tag at a given point in time, wherein an estimated location is determined. The estimated location can be stored.

In another illustrative embodiment, the method further includes recording video images of regions through which the radio frequency identification tag is expected to pass, the video images being time-stamped. In this case, the estimated location of the radio frequency identification tag is used to identify a video image expected to display, for the given point in time, a particular region containing the radio frequency identification tag at the given point in time.

In another illustrative embodiment, the plurality of signals are substantially temporally spaced from one another. The term "substantially temporarily spaced from one another" means that signals within the plurality of signals are received at different times such that an approximate temporal boundary exists between any two given signals.

In another illustrative embodiment, data in the set of datasets is used to calculate a time-correlated movement pattern for the radio frequency identification tag comprises using data in a probabilistic predictive/regressive algorithm.

The aspects of the present invention also provide for a computer implemented method, apparatus, and computer usable program code for determining an estimated location of a radio frequency identification tag in space and time. Partial data regarding the radio frequency identification tag is received. The partial data includes first data indicating receipt of a signal at least one receiver at a first corresponding time. The signal is generated by the radio frequency identification tag at a second corresponding time. The partial data further includes second data indicating that the signal is received at fewer than three receivers at any particular time within a time range. A corresponding location is known of all receivers that receive the signal within the time range. An algorithm is used to determine the estimated location based on the partial data. The estimated location is then stored.

In another illustrative embodiment, the estimated location is an estimated present location. The estimated location can also be an estimated past location and an estimated future location. In another illustrative embodiment, the algorithm is a probabilistic predictive/regressive algorithm.

In another illustrative embodiment, the partial data further includes video data. The video data indicates a second corresponding estimated location of the radio frequency identification tag at a second particular time. In illustrative embodiment, the second particular time is the first corresponding time.

In another illustrative embodiment, the first data is third data indicating receipt of the signal at a first receiver at a first time, fourth data indicating receipt of the signal at a second receiver at the first time, fifth data indicating receipt of the signal at the second receiver at a second time, and sixth data indicating receipt of the signal at a third receiver at the second time. In this case, the second time is different than the first time and the first time and the second time are non-overlapping.

In another illustrative embodiment, means is provided for receiving partial data regarding the radio frequency identification tag, wherein the partial data comprises first data indicating receipt of a signal at least one receiver at a first corresponding time, wherein the signal is generated by the radio frequency identification tag at a second corresponding time, wherein the partial data further comprises second data indicating that the signal is received at fewer than three receivers at any particular time within a time range, and wherein a corresponding location is known of all receivers that receive the signal within the time range. The means for receiving can include any part of a data processing system that can receive data, including but not limited to a wireless receiver, a bus, a wired data link, a processor, or any other means for receiving. A means is also provided for using an algorithm to determine the estimated location based on the partial data. The means for using can include hardware or software for implementing the algorithm, such as, but not limited to, processors, firmware, and software.

In another illustrative embodiment, a signal is received from a radio frequency identification tag at a plurality of receivers over a time range. At any particular time within the time range the signal is received at less than three receivers. The signal is generated at specific times within the time range. Receipt of the signal at a given receiver at a given time within the time range comprises an event. In this manner, a plurality of events arises during the time range. Additionally, corresponding locations of the plurality of receivers are known. The plurality of events is received at a data processing system. An algorithm is executed on the data processing system to process the plurality of events. An estimated location in time and space of the radio frequency identification tag is then generated with the algorithm and based on the plurality of events.

In another illustrative embodiment, generating is further based on video data processed by the algorithm. In this case, the video data indicates a second corresponding estimated location of the radio frequency identification tag at a second particular time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 18 is a flowchart illustrating operation of a probabilistic predictive/regressive algorithm, in accordance with an illustrative embodiment.

DETAILED DESCRIPTION OF THE PREFERRED EMBODIMENT

Figure 1:
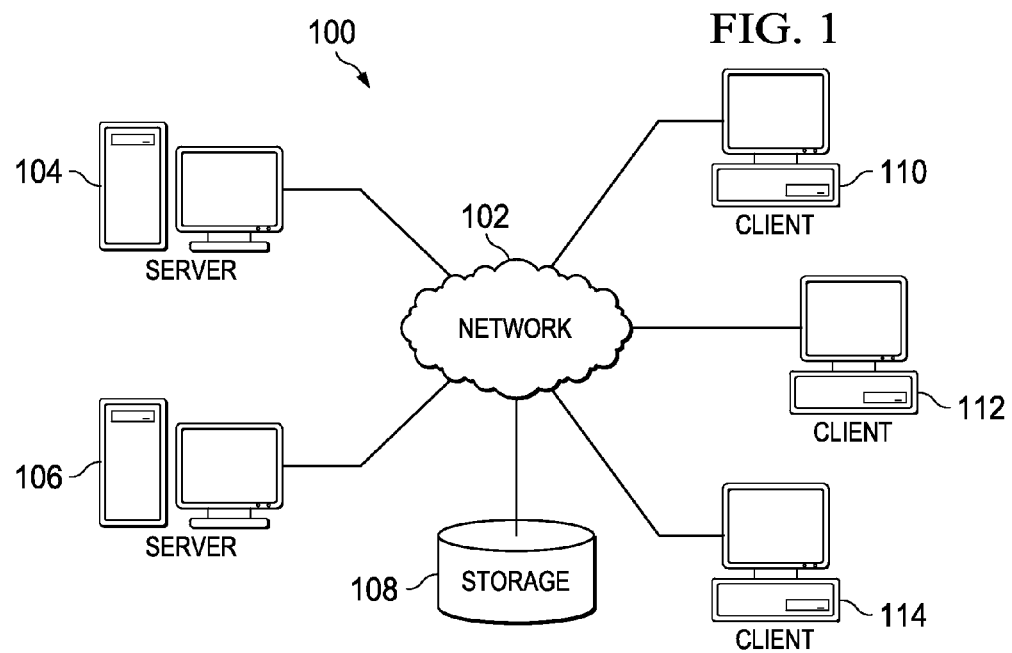
FIG. 1 is a pictorial representation of a network of data processing systems, in which illustrative embodiments may be implemented.
Figure 2:
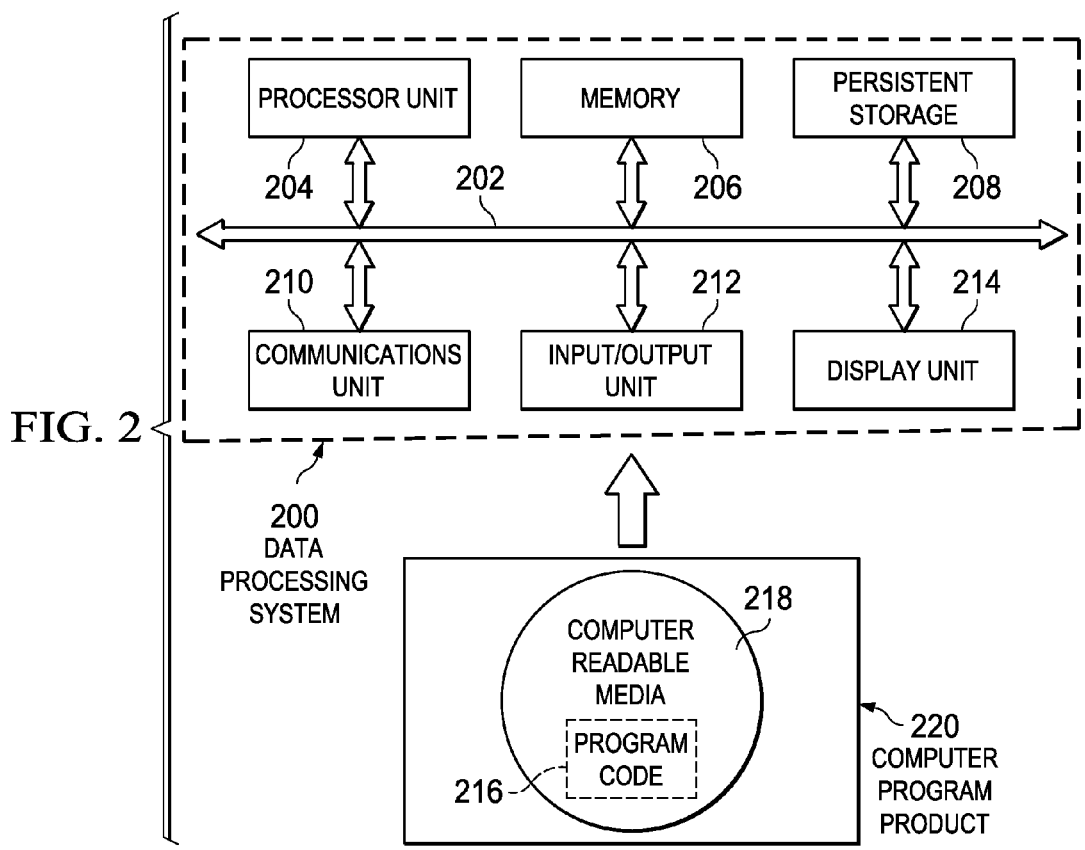
FIG. 2 is a block diagram of a data processing system, in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The aspects of the present invention provide for a computer implemented method, apparatus, and computer usable program code for locating a radio frequency identification tag in time and space using limited information. In particular, the aspects of the present invention provide for a computer implemented method, apparatus, and computer usable program code for estimating, using an algorithm, a location of a radio frequency identification tag when, at any given time, less than three receivers receive a signal from the radio frequency identification tag. In other illustrative embodiments, video data that independently verifies a location of a radio frequency identification tag can be used by the algorithm in conjunction with the other limited information to more accurately estimate a location of the radio frequency identification tag in the past, present, or future.

The aspects of the present invention also provide for a computer implemented method, apparatus, and computer usable program code for determining an estimated location of a radio frequency identification tag in space and time. Partial data regarding the radio frequency identification tag is received. The partial data includes first data indicating receipt of a signal at least one receiver at a first corresponding time. The signal is generated by the radio frequency identification tag at a second corresponding time. The partial data further includes second data indicating that the signal is received at fewer than three receivers at any particular time within a time range. A corresponding location is known of all receivers that receive the signal within the time range. An algorithm is used to determine the estimated location based on the partial data. The estimated location is then stored.

The aspects of the present invention also provide for a means for receiving partial data regarding the radio frequency identification tag, wherein the partial data comprises first data indicating receipt of a signal at least one receiver at a first corresponding time, wherein the signal is generated by the radio frequency identification tag at a second corresponding time, wherein the partial data further comprises second data indicating that the signal is received at fewer than three receivers at any particular time within a time range, and wherein a corresponding location is known of all receivers that receive the signal within the time range. The means for receiving can include any part of a data processing system that can receive data, including but not limited to a wireless receiver, a bus, a wired data link, or any other means for receiving. A means is also provided for using an algorithm to determine the estimated location based on the partial data. The means for using can include hardware or software for implementing the algorithm, such as, but not limited to, processors, firmware, and software.

The aspects of the present invention also provide for a computer implemented method, apparatus, and computer usable program code for receiving from a radio frequency identification tag at a plurality of receivers over a time range. At any particular time within the time range the signal is received at less than three receivers. The signal is generated at specific times within the time range. Receipt of the signal at a given receiver at a given time within the time range comprises an event. In this manner, a plurality of events arises during the time range. Additionally, corresponding locations of the plurality of receivers are known. The plurality of events is received at a data processing system. An algorithm is executed on the data processing system to process the plurality of events. An estimated location in time and space of the radio frequency identification tag is then generated with the algorithm and based on the plurality of events.

Figure 3:
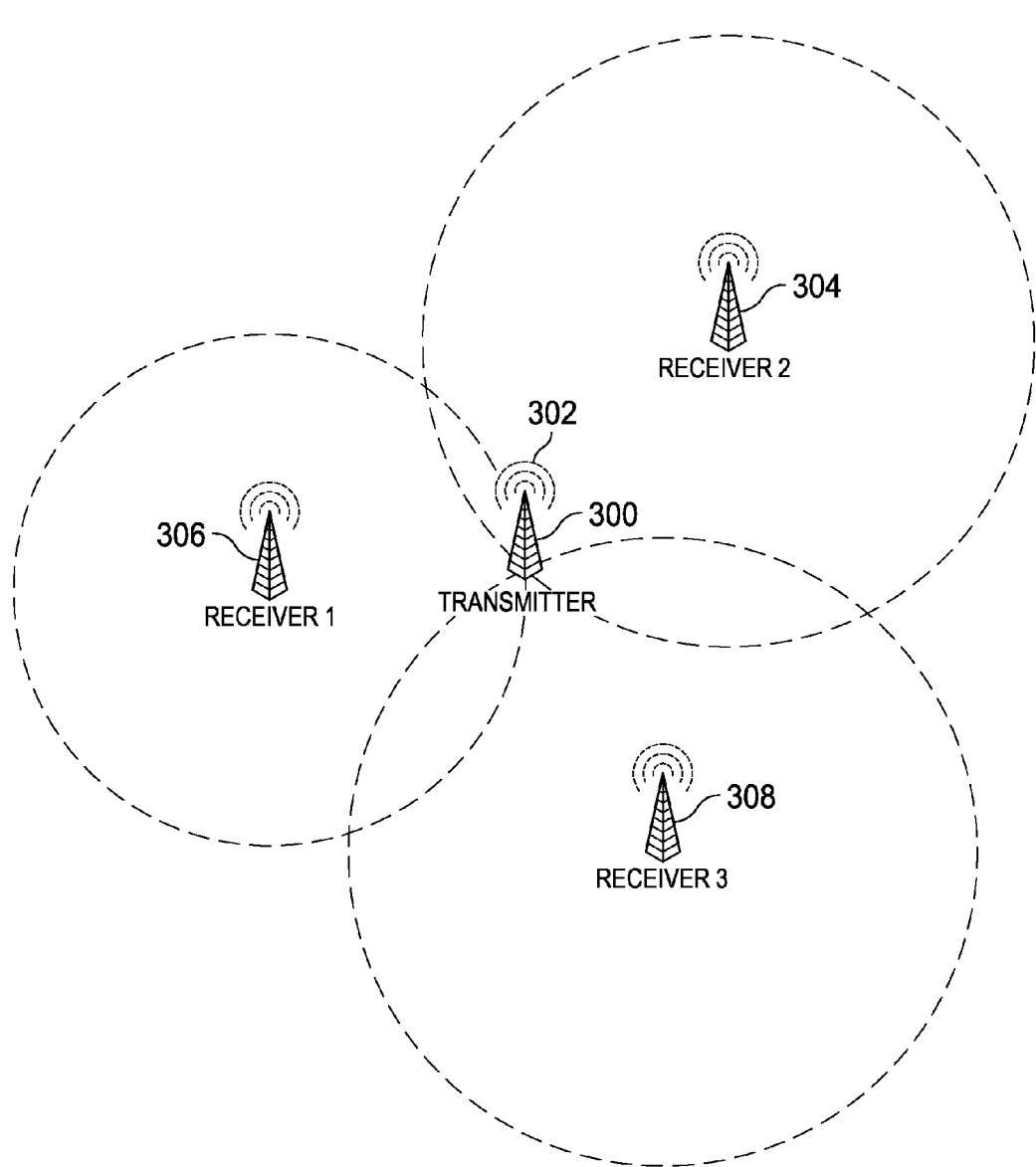
FIG. 3 is an illustration representing a prior art method of locating a radio frequency identification tag in time and space.

FIG. 3 is an illustration representing a prior art method of locating a radio frequency identification tag in time and space. The method shown in FIG. 3 can be implemented in a data processing system, such as servers 104 or 106 or clients 110, 112, or 114 in FIG. 1, or data processing system 200 shown in FIG. 2.

Transmitter 300 represents a radio frequency identification tag. Transmitter 300 transmits one or more radio frequency signals, represented by signal 302. Note that transmitter 300 could transmit other signal wavelengths such as infrared signals or microwave signals.

As shown in FIG. 3, each of receiver 304, receiver 306, and receiver 308 receives signal 302 at a given moment in time. The location of each of receiver 304, receiver 306, and receiver 308 is known. The time difference between when signal 302 is transmitted and when signal 302 is received can be used to determine a distance between transmitter 300 and a corresponding receiver. In other illustrative embodiments, at least one of a strength, polarity, or direction vector of signal 302 is known and can be used to determine a distance between transmitter 300 and the corresponding transceiver. Using known mathematical algorithms, all of the above-described information can be processed to determine a location of transmitter 300 in two-dimensional space or three-dimensional space at a particular time. The method of determining the location of transmitter 300 in this manner is known as triangulation.

However, a problem arises in tracking radio frequency identification tags if only incomplete information is available. For example, if only one or two receivers can detect the signal from the radio frequency identification tag, then triangulating the position of the radio frequency identification tag is impossible.

This problem can arise under many circumstances. For example, an object to which the radio frequency identification tag is attached may move into a zone through which a radio signal of sufficient power cannot be transmitted. In this case, the radio signal may be received by first and second receivers during a first time period, but only second and third receivers during a second time period. However, because at no time could the signal be received by all three receivers, triangulation cannot be used to determine the position of the radio frequency identification tag at any point. In this case, the only information available is that the signal from the radio frequency identification tag could be detected by first and second receivers during the first time period and by the second receiver and a third receiver during the second time period. This situation can also arise under other circumstances, such as when receivers are located far apart from each other relative to the signal strength generated by the radio frequency identification tag.

The above example shows a situation when incomplete information is available to determine a position of a radio frequency identification tag in time and space. Other situations and examples exist in which only incomplete information exists for making this determination.

Figure 4:
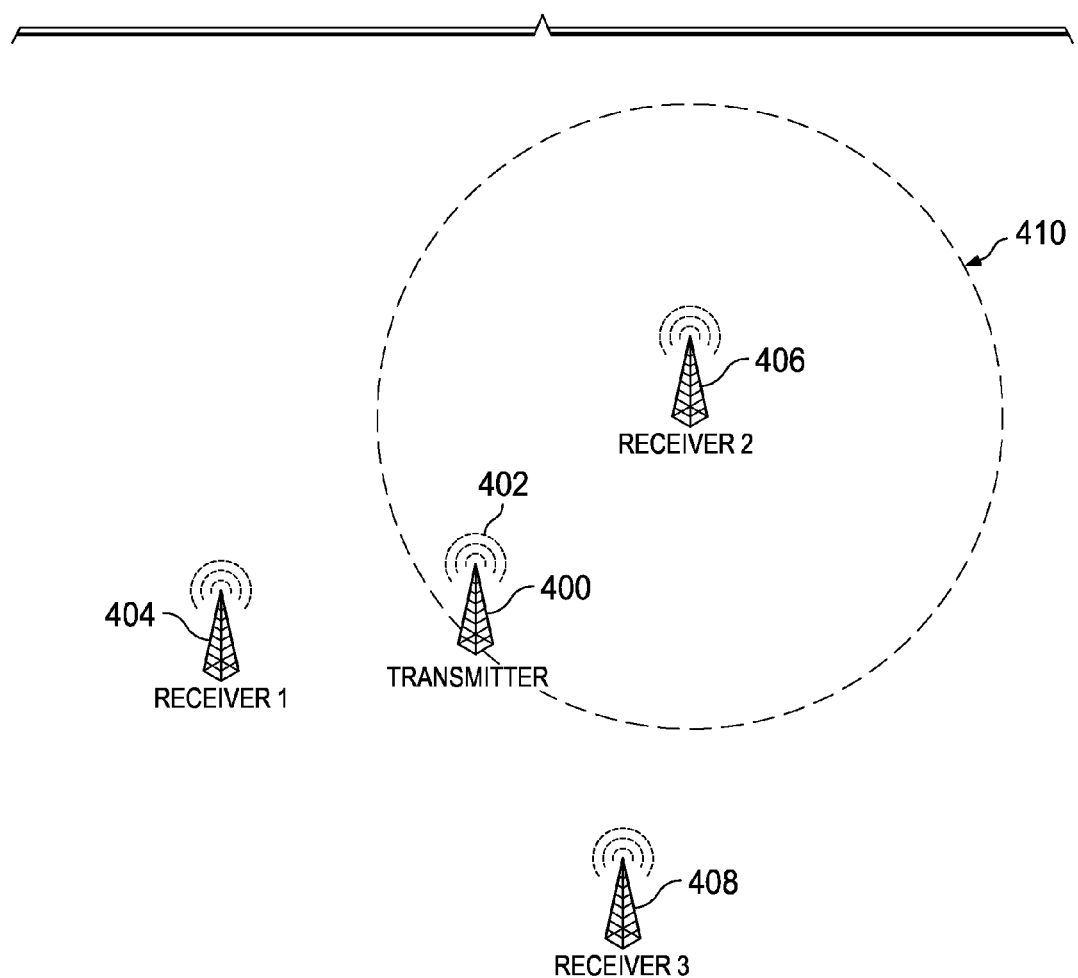
FIG. 4 is an illustration representing a radio frequency identification tag transmitter and a number of receivers, in accordance with an illustrative embodiment.

FIG. 4 is an illustration representing a radio frequency identification tag transmitter and a number of receivers, in accordance with an illustrative embodiment. The fact that a signal has been received at a given receiver can be recorded as data. The corresponding locations of all receivers shown are known. FIG. 4 through FIG. 7 are related to each other in order to demonstrate the problem described with respect to FIG. 3. Hence, FIG. 4 through FIG. 7 use similar reference numerals for ease of reference.

As shown in FIG. 4, transmitter 400 transmits signal 402. Receiver 404, receiver 406, and receiver 408 are available to possibly receive signal 402. However, for one or more of many possible reasons, only receiver 406 receives signal 402, as shown by phantom line 410.

Some of the reasons why receiver 404 and receiver 408 may not receive signal 402 include 1) transmitter 400 is out of range of those receivers, 2) due to the location of transmitter 400, signal 402 is blocked with respect to receiver 404 and receiver 408, 3) only receiver 406 is operational at a given moment in time, or many other possible reasons. Whatever the reason, only receiver 406 receives signal 402 at a first time.

Even with information such as the timing, strength, polarity, or directionality of signal 402, data regarding signal 402 gathered at a single receiver is insufficient to determine, using existing techniques, a location in time and space of transmitter 400. However, in conjunction with other information gathered in at least one of FIG. 5 through FIG. 7, the location in time and space of transmitter 400 can be determined.

Figure 5:
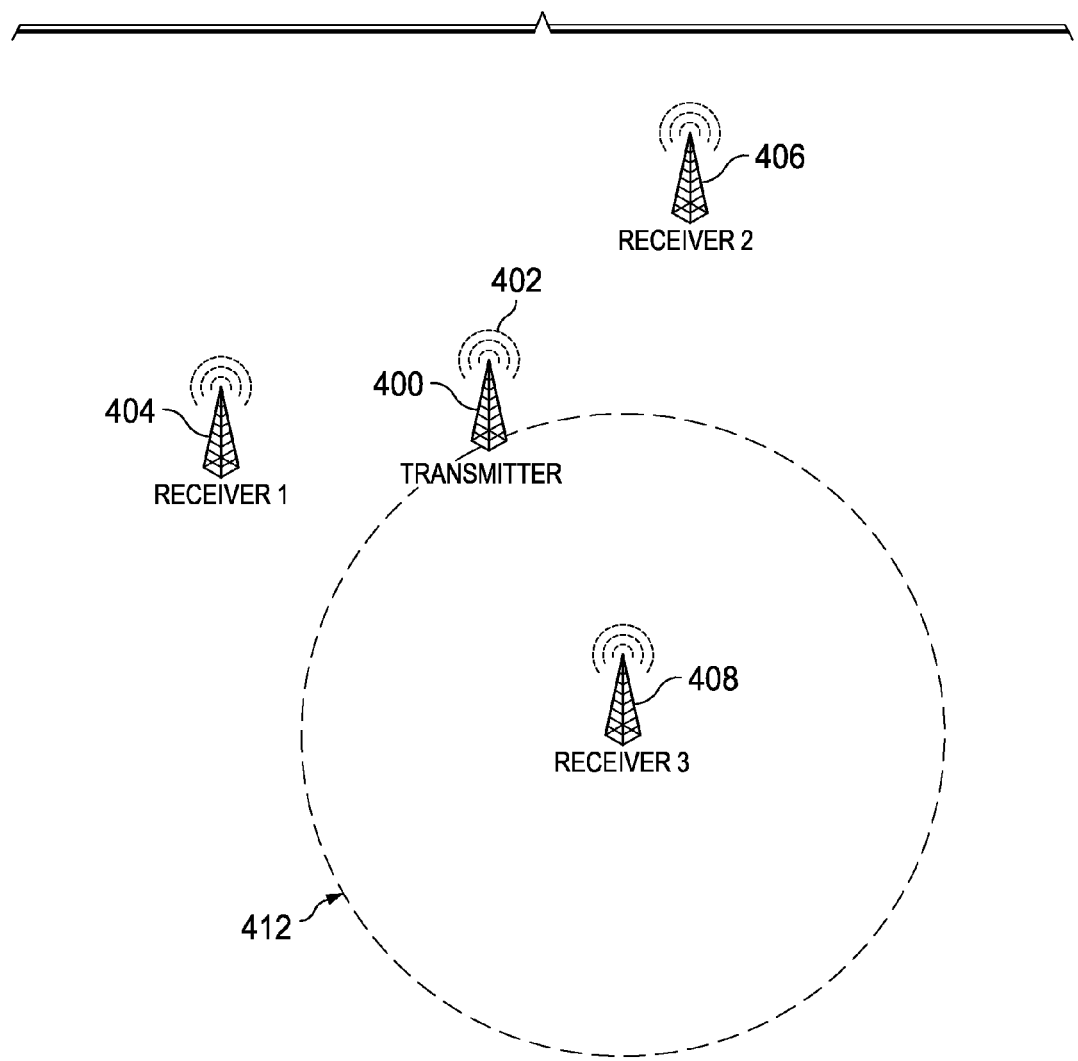
FIG. 5 is an illustration representing a radio frequency identification tag transmitter and a number of receivers, in accordance with an illustrative embodiment.

FIG. 5 is an illustration representing a radio frequency identification tag transmitter and a number of receivers, in accordance with an illustrative embodiment. The fact that a signal has been received at a given receiver can be recorded as data. The corresponding locations of all receivers shown are known. FIG. 4 through FIG. 7 are related to each other in order to demonstrate the problem described with respect to FIG. 3. Hence, FIG. 4 through FIG. 7 use similar reference numerals for ease of reference.

The situation illustrated in FIG. 5 is described with respect to a second time relative to the first time described with respect to FIG. 4. At the second time, only receiver 408 can detect signal 402 of transmitter 400, as shown by phantom line 412. Again, one or more reasons may be the cause of the situation shown in FIG. 5; one or more of which may be different than the reasons described with respect to FIG. 4. In any case, the spatial location of transmitter 400 at the second time (FIG. 5) may or may not be different than the spatial location of transmitter 400 at the first time (FIG. 4). In the illustrative examples described herein, the spatial location of transmitter 400 is different at the second time relative to the first time.

Figure 6:
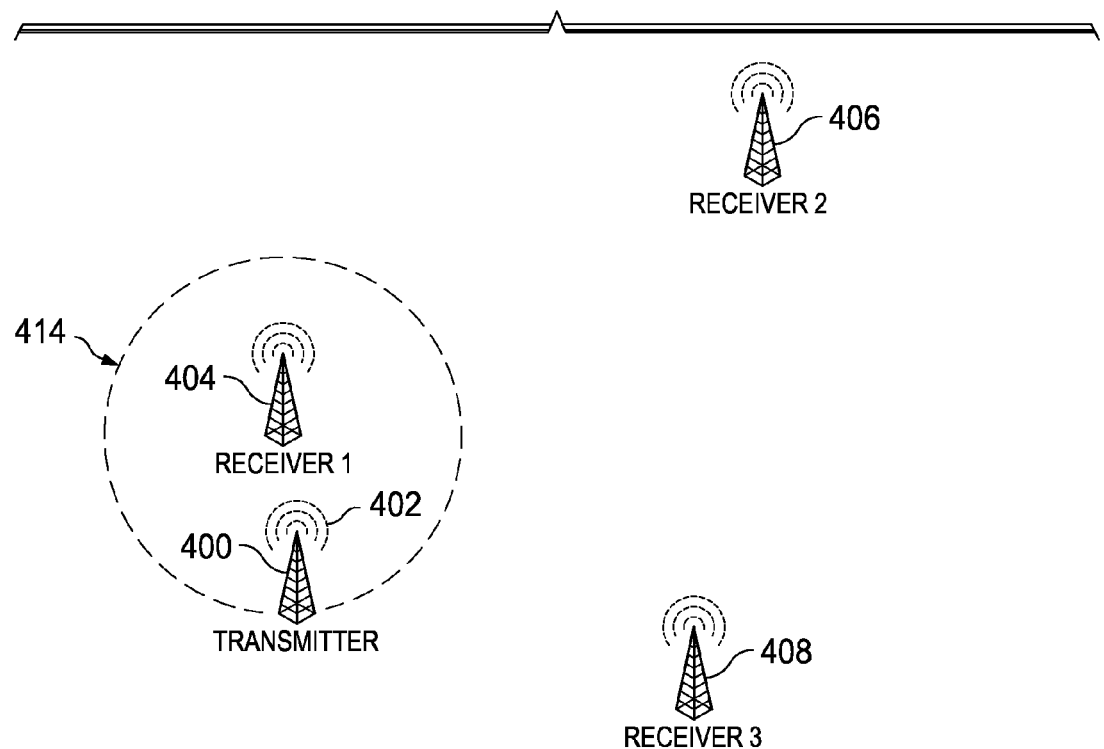
FIG. 6 is an illustration representing a radio frequency identification tag transmitter and a number of receivers, in accordance with an illustrative embodiment.

FIG. 6 is an illustration representing a radio frequency identification tag transmitter and a number of receivers, in accordance with an illustrative embodiment. The fact that a signal has been received at a given receiver can be recorded as data. The corresponding locations of all receivers shown are known. FIG. 4 through FIG. 7 are related to each other in order to demonstrate the problem described with respect to FIG. 3. Hence, FIG. 4 through FIG. 7 use similar reference numerals for ease of reference.

The situation illustrated in FIG. 6 is described with respect to a third time relative to the first time described with respect to FIG. 4 and the second time described with respect to FIG. 5. At the third time, only receiver 404 can detect signal 402 of transmitter 400, as shown by phantom line 414. Again, one or more reasons may be the cause of the situation shown in FIG. 6; one or more of which may be different than the reasons described with respect to FIG. 4 or FIG. 5. In any case, the spatial location of transmitter 400 at the second time (FIG. 5) may or may not be different than the spatial location of transmitter 400 at the first time (FIG. 4). Similarly, the spatial location of transmitter 400 at the third time (FIG. 6) may or may not be different than the spatial location of transmitter 400 at the first time (FIG. 5). In the illustrative examples described herein, the spatial location of transmitter 400 is different at the third time relative to the first or second times.

Figure 7:
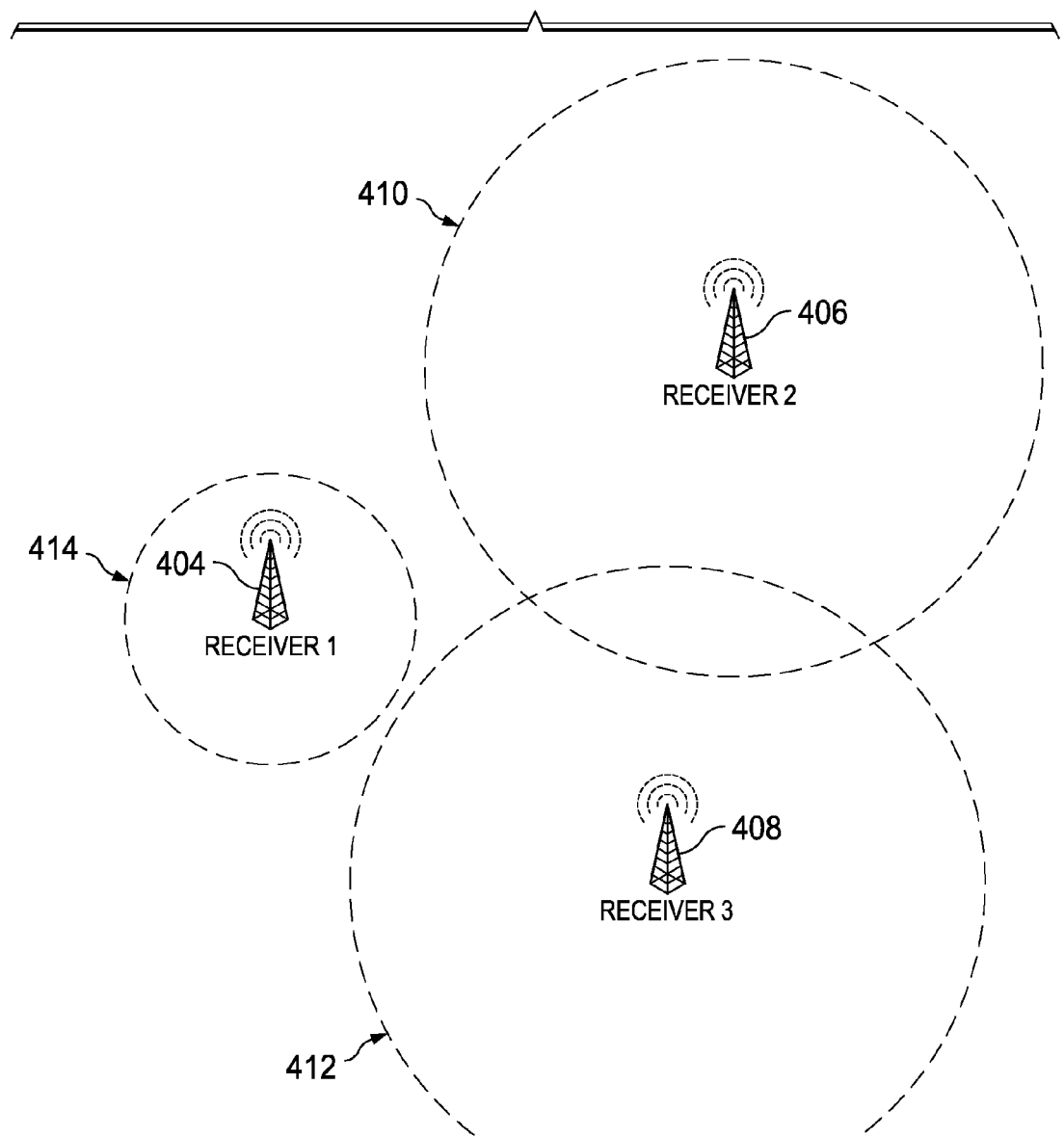
FIG. 7 is an illustration representing possible locations of a radio frequency identification tag at various times in relation to a number of receivers, in accordance with an illustrative embodiment.

FIG. 7 is an illustration representing possible locations of a radio frequency identification tag at various times in relation to a number of receivers, in accordance with an illustrative embodiment. The fact that a signal has been received at a given receiver can be recorded as data. The corresponding locations of all receivers shown are known. FIG. 4 through FIG. 7 are related to each other in order to demonstrate the problem described with respect to FIG. 3. Hence, FIG. 4 through FIG. 7 use similar reference numerals for ease of reference.

FIG. 7 illustrates the summary of the data received at the first time, the second time, and the third time. At the first time, receiver 406 received a signal from transmitter 400, as shown by phantom line 410. At the second time, receiver 408 received a signal from transmitter 400, as shown by phantom line 412. At the third time, receiver 404 received a signal from transmitter 400, as shown by phantom line 414.

Phantom line 410 and 412 overlap. In this illustrative embodiment, the overlapping of the lines indicates that sufficient partial data existed to determine that transmitter 400 was within transmission range of both receiver 406 and receiver 408 within at least a part of the time period covering the length of first time and the second time combined. In contrast, phantom line 414 does not overlap with phantom lines 410 and 412. Thus, a similar inference cannot be made with regard to the spatial location of transmitter 400 at the third time.

As a result of the situation shown in FIG. 7, insufficient data exists to determine a location of transmitter 400 in space-time using conventional techniques. Moreover, a location of transmitter 400 in three-dimensional or two-dimensional space cannot be made using conventional techniques. However, as shown below, an estimated position of transmitter 400 in space-time can be determined. In other words, an estimation can be made of the position in space of transmitter 400 at any particular moment in time, whether that moment be in the past or the present, using the data available from the situations described with respect to FIG. 4 through FIG. 7. The data gathered through the situations shown in FIG. 4 through FIG. 7 can be referred to as partial data.

Figure 8:
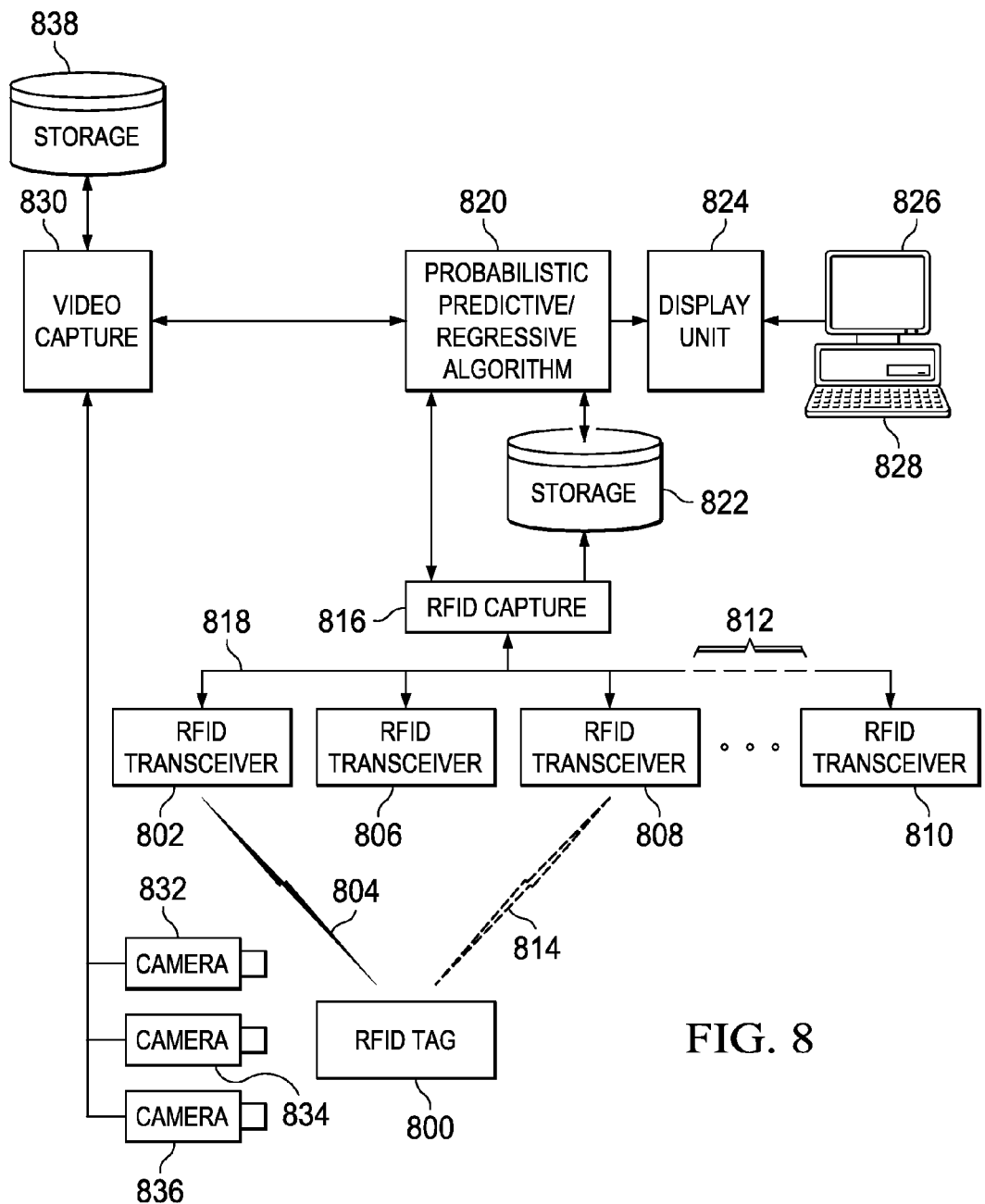
FIG. 8 is a block diagram of a system for locating radio frequency identification tags in time and space using partial information, in accordance with an illustrative embodiment.

FIG. 8 is a block diagram of a system for locating radio frequency identification tags in time and space using partial information, in accordance with an illustrative embodiment. The system shown in FIG. 8 can be implemented using one or more data processing systems, such as servers 104 or 106 or clients 110, 112, or 114 in FIG. 1, or data processing system 200 shown in FIG. 2. The algorithm described herein can be implemented in one or more of these data processing systems. Although the process shown with respect to FIG. 8 is implemented with respect to one radio frequency identification tag physically attached to one object, the methods described with respect to FIG. 8 can be expanded to estimate a space-time location of multiple objects simultaneously.

As shown in FIG. 8, a corresponding radio frequency identification tag 800 is attached to an object of interest. Radio frequency identification transceiver 802 (RFID transceiver) receives full signal 804 transmitted by radio frequency identification tag 800. The time at which full signal 804 was transmitted from radio frequency identification tag 800 is known. The time at which full signal 804 was received at radio frequency identification transceiver 802 is also known. Because the speed of light (the speed of the radio signals) is a constant, these two times can be used to determine a distance between radio frequency identification tag 800 and radio frequency identification transceiver 802. The time between receipt of full signal 804 and receipt of past signal 814 is also known.

Radio frequency identification transceiver 806, radio frequency identification transceiver 808, and the remaining radio frequency identification transceivers through radio frequency identification transceiver 810 are not receiving signals from radio frequency identification tag 800. Note that many additional radio frequency identification transceivers may exist, as indicated by phantom line 812.

However, radio frequency identification transceiver 808 did receive past signal 814 from radio frequency identification tag 800 at some point in the past. Past signal 814 and current full signal 804 are transmitted to radio frequency identification capture device 816, as indicated by multiple arrows 818. Additional information transmitted to radio frequency identification capture device 816 can include a radio frequency identification tag number, the time of signal detection, the frequency of the signal detected, and the strength of the signal detected. In an illustrative embodiment, all of this information is transmitted to radio frequency identification capture device 816.

As with full signal 404, the time at which past signal 814 was transmitted from radio frequency identification tag 800 is known. The time at which past signal 814 was received at radio frequency identification transceiver 802 is also known. Because the speed of light (the speed of the radio signals) is a constant, these two times can be used to determine a distance between radio frequency identification tag 800 and radio frequency identification transceiver 808. The time between receipt of full signal 804 and receipt of past signal 814 is also known.

In a non-limiting example, radio frequency identification capture device 816 is a data processing system, though radio frequency identification capture device 816 can be other software or hardware that is part of an overall data processing system that implements the methods described with respect to FIG. 8. In any case, radio frequency identification capture device 816 saves the data transmitted by radio frequency identification transceivers 802 and 808 and reports this data to probabilistic predictive/regressive algorithm 820. Radio frequency identification capture device 816 also transmits this data to storage device 822, which can be a non-volatile or a volatile memory.

Storage device 822 stores the data gathered from radio frequency identification capture device 802 and radio frequency identification capture device 808. Probabilistic predictive/regressive algorithm 820 uses data in storage device 822, as described further below. Storage device 822 also contains information, possibly in databases, regarding detailed mappings of the radio frequency identification tag number to the description and source of the object of interest.

Probabilistic predictive/regressive algorithm 820 is an algorithm, implemented in either hardware or software, that maps each new signal received from a radio frequency identification transceiver against the data held in storage device 822. Thus, for example, probabilistic predictive/regressive algorithm 820 will compare the information received regarding signal 814 to the information received regarding current signal 804. Probabilistic predictive/regressive algorithm 820 uses a regression mathematical technique to determine a probability that radio frequency identification tag 800 is at a particular point in space in the past, present, or future, based on the history of data received from radio frequency identification transceivers 802, 806, 808, and 810. As additional data is received from these radio frequency identification transceivers, probabilistic predictive/regressive algorithm 820 continues to further refine the probabilities that radio frequency identification tag 800 is, was, or will be at any given point in space at a particular time.

The probabilities that radio frequency identification tag 800 is at a given point in space time can be displayed on display unit 824. An example of a display unit 824 is monitor 826 associated with data processing system 828. Examples of these graphs are shown with regard to FIG. 9 through FIG. 14. A user can use data processing system 828 to view images from video capture system 830. A user can also use data processing system 828 to control how images or graphs or probabilities are viewed on monitor 826. A user can also use data processing system 828 to control the behavior of one or more of probabilistic predictive/regressive algorithm 820 or video capture system 830.

Optionally, video capture system 830 can be used to improve the accuracy of the estimated location of radio frequency identification tag 800 in space-time. Video capture system 830 is not needed to implement the illustrative embodiments described herein, but video capture system 830 can possibly improve the performance of the illustrative examples described herein.

Video capture system 830 can operate in many environments, though is well suited to a manufacturing environment where the location of video cameras can be carefully panned and known. Video capture system 830 uses multiple cameras, such as camera 832, camera 834, and camera 836, to monitor one or more locations of where the object associated with radio frequency identification tag 800 could be within a given environment. In a non-limiting illustrative example, all areas where an object could be within a given environment are monitored. Thus, more or fewer cameras than the three cameras shown in FIG. 8 could be used.

Video capture system 830 takes video images from one or more of cameras 832, 834, and 836, adds a time stamp to each video image, and saves the video images to a storage device, such as storage device 838. In an illustrative example, storage device 838 can be the same storage device or a different storage device as storage device 822. Storage device 838 can be implemented as either volatile or non-volatile memory.

In an illustrative embodiment, probabilistic predictive/regressive algorithm 820 requests data from video capture system 830 to provide certain images corresponding to certain cameras, certain time stamps, certain locations monitored by one or more cameras, or combinations thereof. Video capture system 830 responds to this request by searching storage device 838 for all images that match the requested search criterion. These images are transmitted to probabilistic predictive/regressive algorithm 820.

Note that some or all of these images can be transmitted to probabilistic predictive/regressive algorithm 820 without a request from probabilistic predictive/regressive algorithm 820. Thus, the request is not necessary to the implementation of the illustrative embodiments described herein.

Probabilistic predictive/regressive algorithm 820 can take as additional data the images from video capture system 830, compare that data to the historical data gathered by radio frequency identification capture device 816, and use the additional data to further refine the probability of where radio frequency identification tag 800 is at any given point in space-time, whether past, present, or future. For example, probabilistic predictive/regressive algorithm 820 receives the radio frequency identification tag number, the distance from radio frequency identification transceiver 808, and time of past signal 814, the radio frequency identification tag number, the distance from radio frequency identification transceiver 802, and time of current signal 804, and one or more video images of the object associated with radio frequency identification tag 800 at one or more times, compares all of this data, and determines a probability of where radio frequency identification tag 800 is in space at a particular time. The same information can be used to estimate where radio frequency identification tag 800 was at a point in the past. The same information can be used to estimate where radio frequency identification tag 800 will be at a point in the future. An example of the operations probabilistic predictive/regressive algorithm 818 is provided with respect to FIG. 18.

Figure 9:
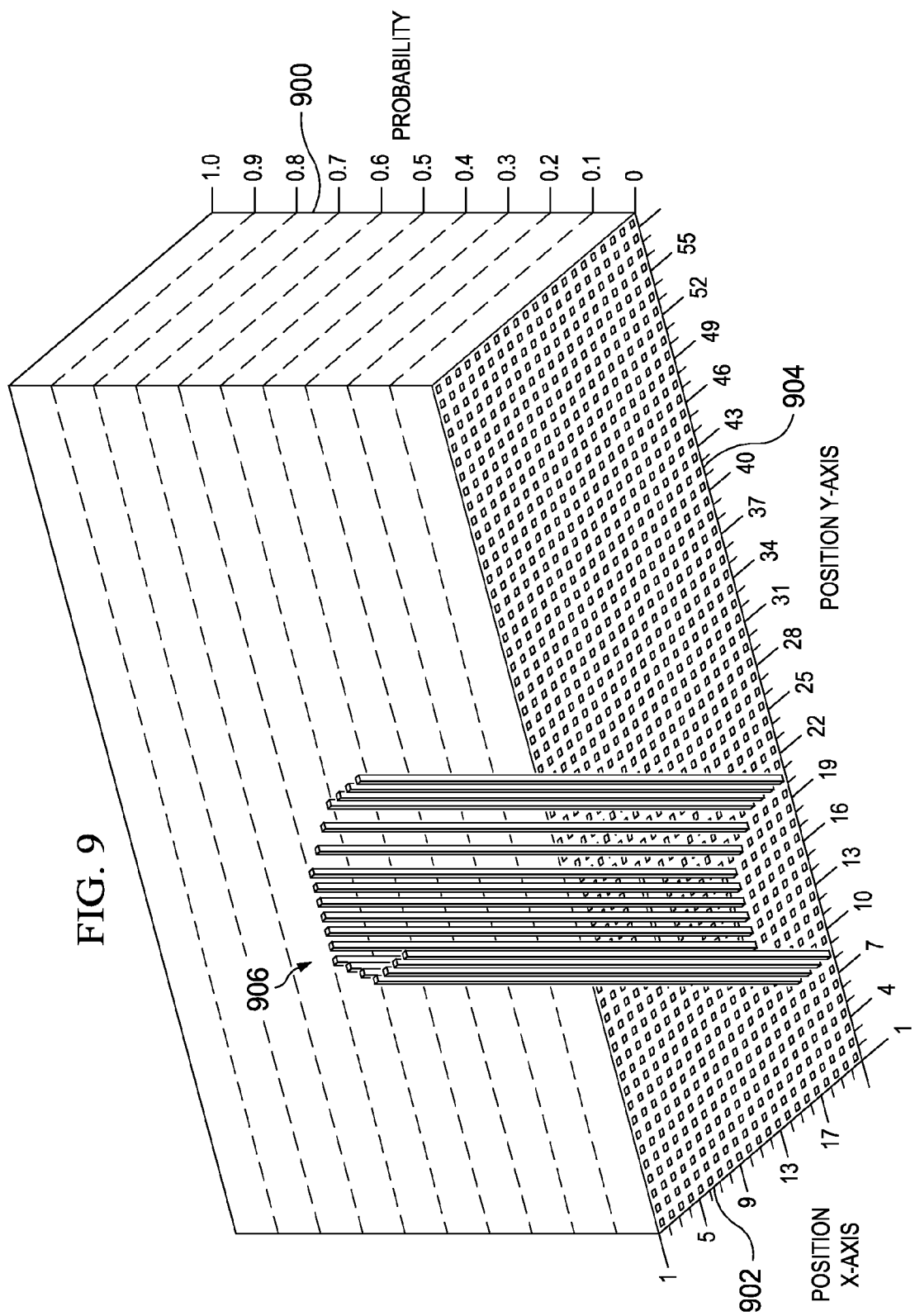
FIG. 9 is a graph of probabilities that a radio frequency identification tag is at a given location in space, in accordance with an illustrative embodiment.

FIG. 9 is a graph of probabilities that a radio frequency identification tag is at a given location in space, in accordance with an illustrative embodiment. The graph shown in FIG. 9 can be implemented in a data processing system, such as servers 104 or 106 or clients 110, 112, or 114 in FIG. 1, or data processing system 200 shown in FIG. 2. The graph shown in FIG. 9 can be created using the system shown in FIG. 8.

FIG. 9 shows a probability that an object, or radio frequency identification tag, is at a given position in two-dimensional space at a first time. Axis 900 shows relative probability, axis 902 shows the position along a "X" direction in a defined coordinate system, and axis 904 shows a position along a "Y" direction in the defined coordinate system. Bars 906 show the probability that an object is at a particular X-Y coordinate at the first time.

Figure 10:
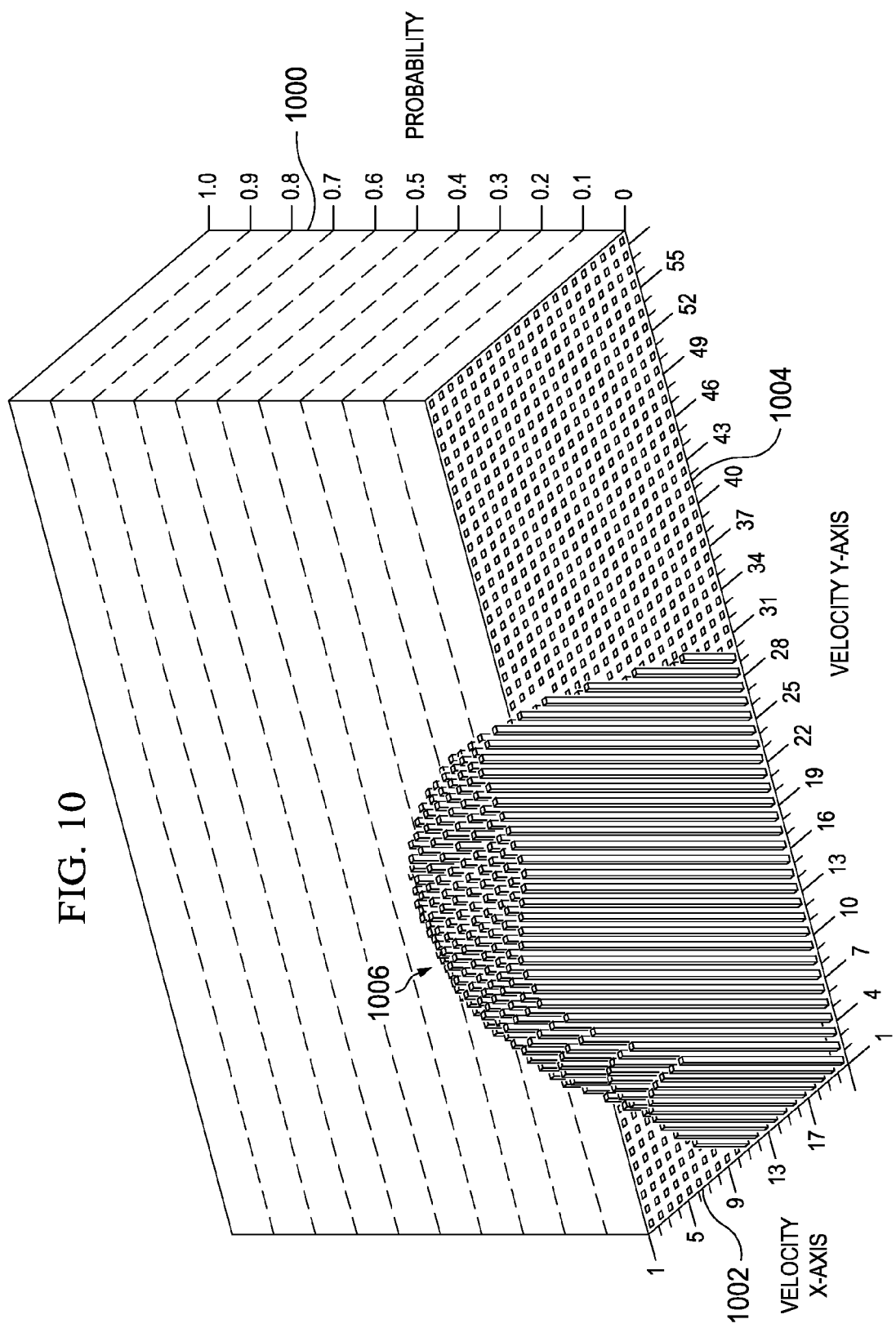
FIG. 10 is a graph of probabilities that a radio frequency identification tag has a particular velocity, in accordance with an illustrative embodiment.

FIG. 10 is a graph of probabilities that a radio frequency identification tag has a particular velocity, in accordance with an illustrative embodiment. The graph shown in FIG. 10 can be implemented in a data processing system, such as servers 104 or 106 or clients 110, 112, or 114 in FIG. 1, or data processing system 200 shown in FIG. 2. The graph shown in FIG. 10 can be created using the system shown in FIG. 8.

The graph shown in FIG. 10 is related to the graph shown in FIG. 9, in that an estimated velocity of the radio frequency identification tag is provided at the first time. Axis 1000 shows relative probability, axis 1002 shows the velocity along a "X" direction in the defined coordinate system of FIG. 9, and axis 1004 shows a velocity along a "Y" direction in the defined coordinate system of FIG. 9. Bars 1006 show the probability that an object has a first particular velocity along X and a second particular velocity along Y at the first time.

Figure 11:
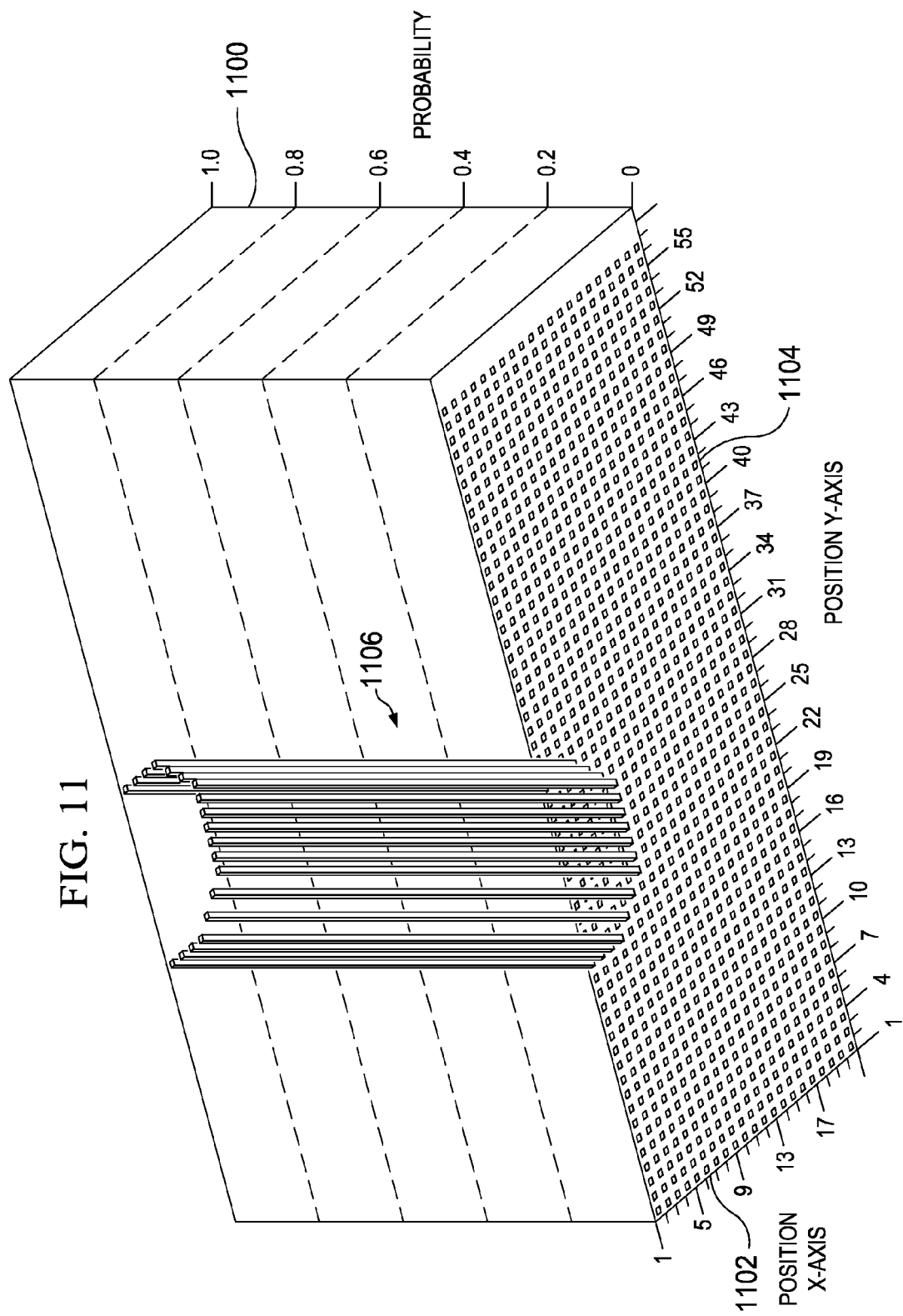
FIG. 11 is a graph of probabilities that a radio frequency identification tag is at a given location in space, in accordance with an illustrative embodiment.

FIG. 11 is a graph of probabilities that a radio frequency identification tag is at a given location in space, in accordance with an illustrative embodiment. The graph shown in FIG. 11 can be implemented in a data processing system, such as servers 104 or 106 or clients 110, 112, or 114 in FIG. 1, or data processing system 200 shown in FIG. 2. The graph shown in FIG. 11 can be created using the system shown in FIG. 8.

FIG. 11 shows a probability that an object, or radio frequency identification tag, is at a given position in two-dimensional space at a second time. Axis 1100 shows relative probability, axis 1102 shows the position along a "X" direction in a defined coordinate system, and axis 1104 shows a position along a "Y" direction in the defined coordinate system. Bars 1106 show the probability that an object is at a particular X-Y coordinate at the first time.

Figure 12:
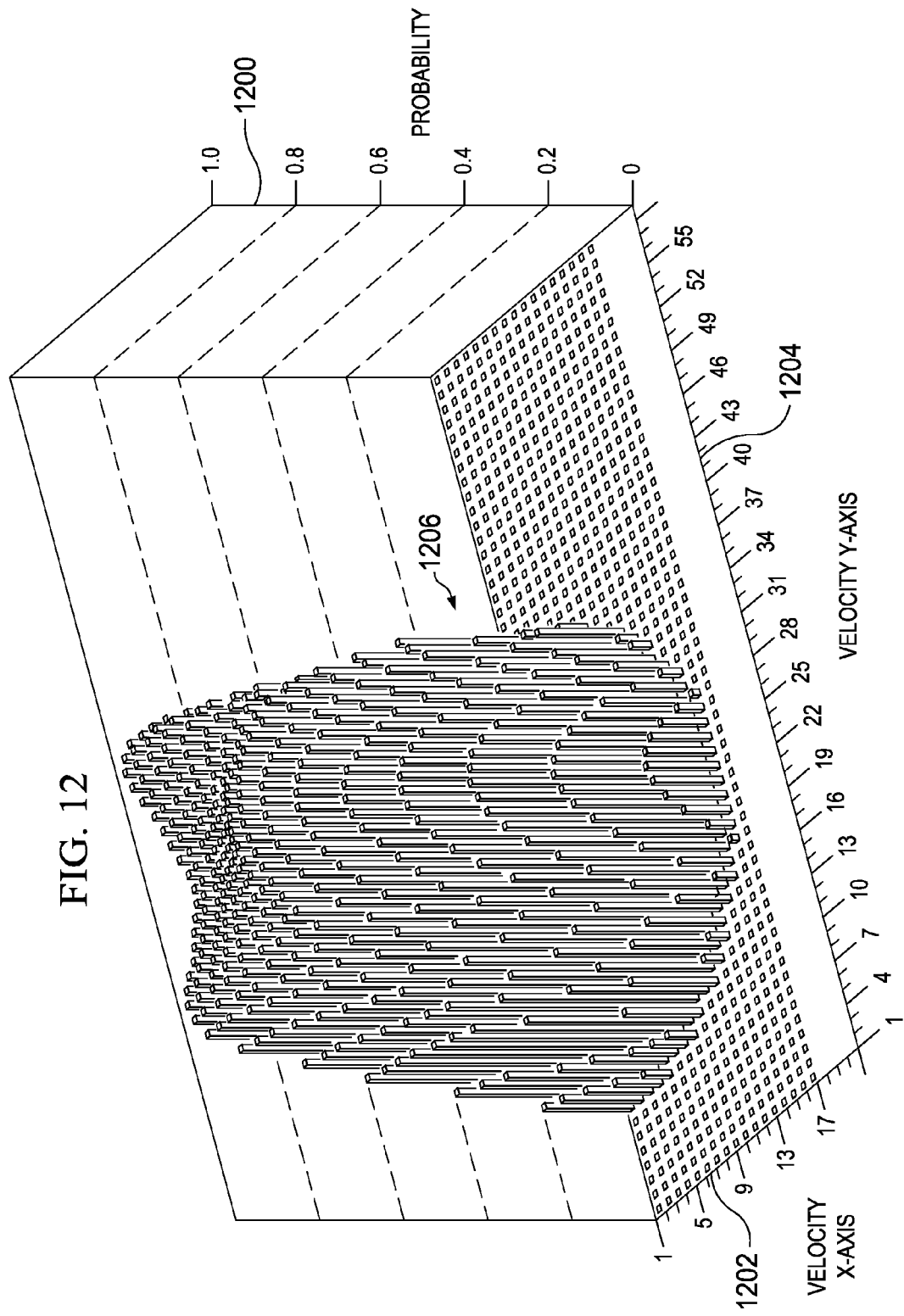
FIG. 12 is a graph of probabilities that a radio frequency identification tag has a particular velocity, in accordance with an illustrative embodiment.

FIG. 12 is a graph of probabilities that a radio frequency identification tag has a particular velocity, in accordance with an illustrative embodiment. The graph shown in FIG. 12 can be implemented in a data processing system, such as servers 104 or 106 or clients 110, 112, or 114 in FIG. 1, or data processing system 200 shown in FIG. 2. The graph shown in FIG. 12 can be created using the system shown in FIG. 8.

The graph shown in FIG. 12 is related to the graph shown in FIG. 11, in that an estimated velocity of the radio frequency identification tag is provided at the second time. Axis 1200 shows relative probability, axis 1202 shows the velocity along a "X" direction in the defined coordinate system of FIG. 9, and axis 1204 shows a velocity along a "Y" direction in the defined coordinate system of FIG. 9. Bars 1206 show the probability that an object has a first particular velocity along X and a second particular velocity along Y at the second time.

Figure 13:
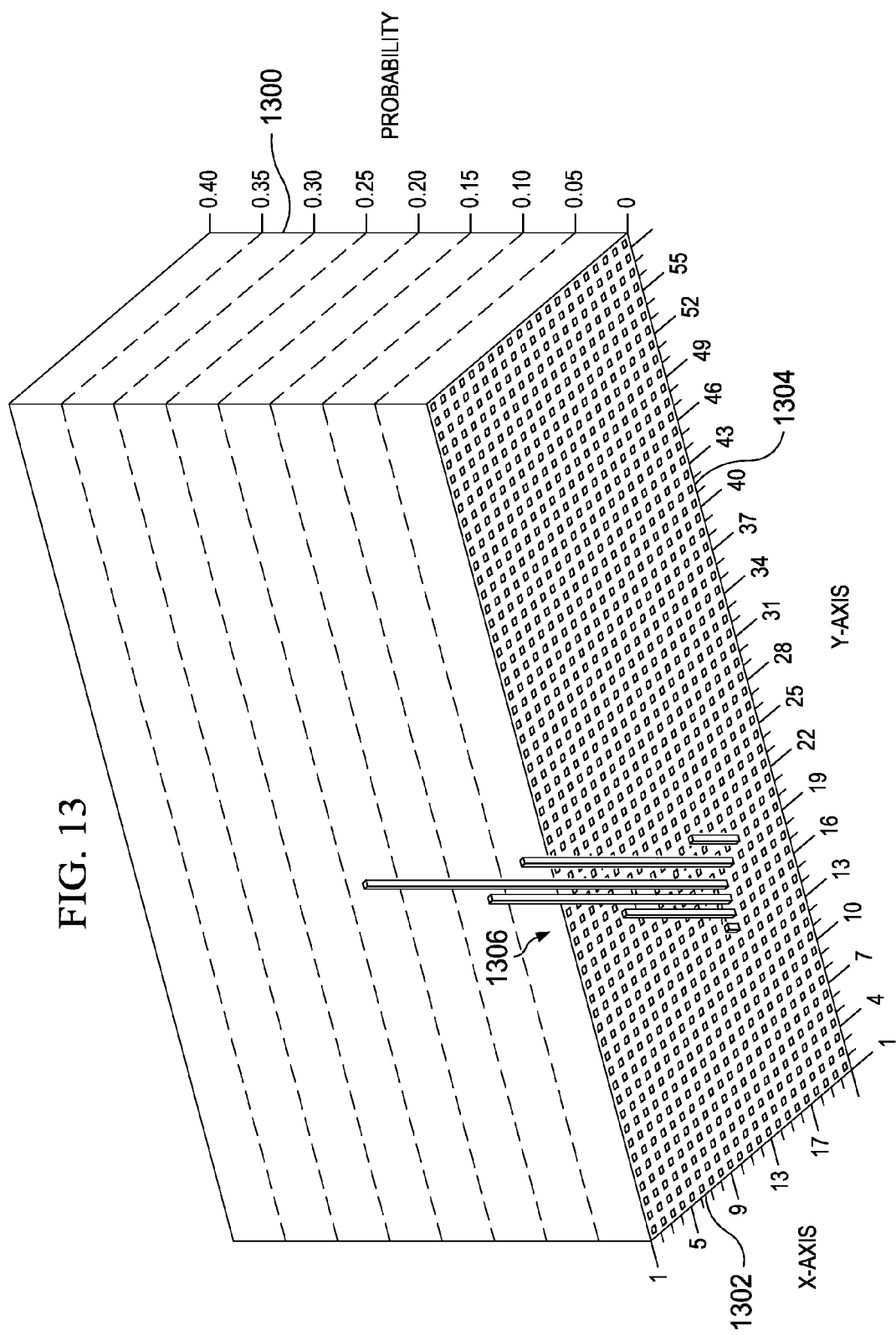
FIG. 13 is a graph of probabilities that a radio frequency identification tag is at a given velocity in space when combined with a statistical location map, in accordance with an illustrative embodiment.

FIG. 13 is a graph of probabilities that a radio frequency identification tag is at a given velocity in space when combined with a statistical location map, in accordance with an illustrative embodiment. The graph shown in FIG. 13 can be implemented in a data processing system, such as servers 104 or 106 or clients 110, 112, or 114 in FIG. 1, or data processing system 200 shown in FIG. 2. The graph shown in FIG. 13 can be created using the system shown in FIG. 8, using the algorithm described with respect to FIG. 8.

The graph shown in FIG. 13 is a combination of the data from the velocity map of the first time, shown in FIG. 10, with the location map of the first time, shown in FIG. 9. By combining the information, the probability that the radio frequency identification tag has a given velocity can be narrowed considerably, as shown in FIG. 13. Again, probability is shown along axis 1300, velocity along the "X" direction is shown along axis 1302, the velocity along the "Y" direction is shown along axis 1304, and bars 1306 show the probability distribution.

Figure 14:
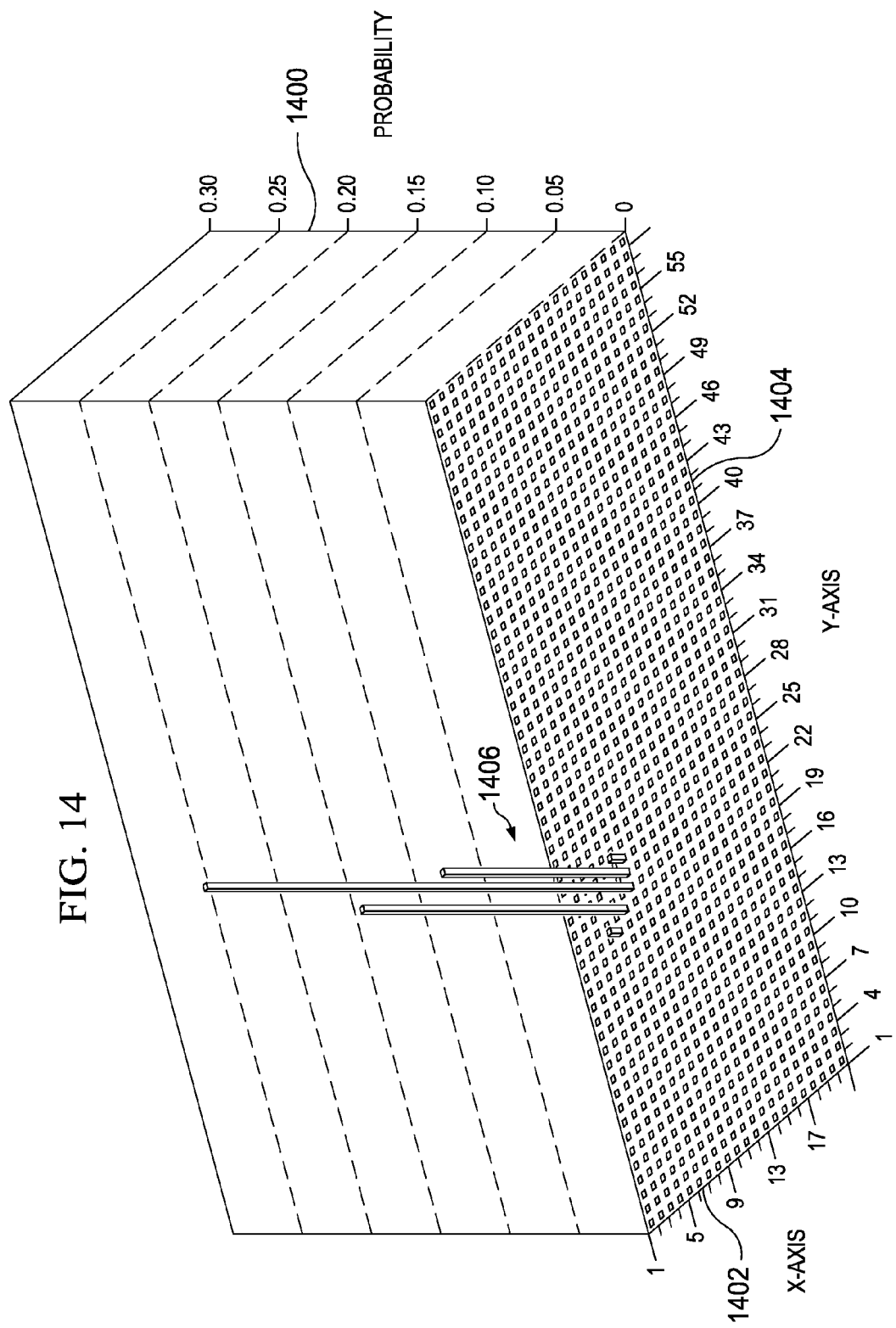
FIG. 14 is a graph of probabilities that a radio frequency identification tag is at a given velocity in space when combined with a statistical location map, in accordance with an illustrative embodiment.

FIG. 14 is a graph of probabilities that a radio frequency identification tag is at a given location in space when combined with a statistical velocity map, in accordance with an illustrative embodiment. The graph shown in FIG. 14 can be implemented in a data processing system, such as servers 104 or 106 or clients 110, 112, or 114 in FIG. 1, or data processing system 200 shown in FIG. 2. The graph shown in FIG. 14 can be created using the system shown in FIG. 8, using the algorithm described with respect to FIG. 8.

The graph shown in FIG. 14 is a combination of the data from the velocity map of the first time, shown in FIG. 12, with the location map of the first time, shown in FIG. 11. By combining the information, the probability that the radio frequency identification tag has a given velocity can be narrowed considerably, as shown in FIG. 14. Again, probability is shown along axis 1400, velocity along the "X" direction is shown along axis 1402, the velocity along the "Y" direction is shown along axis 1404, and bars 1406 show the probability distribution.

Figure 15:
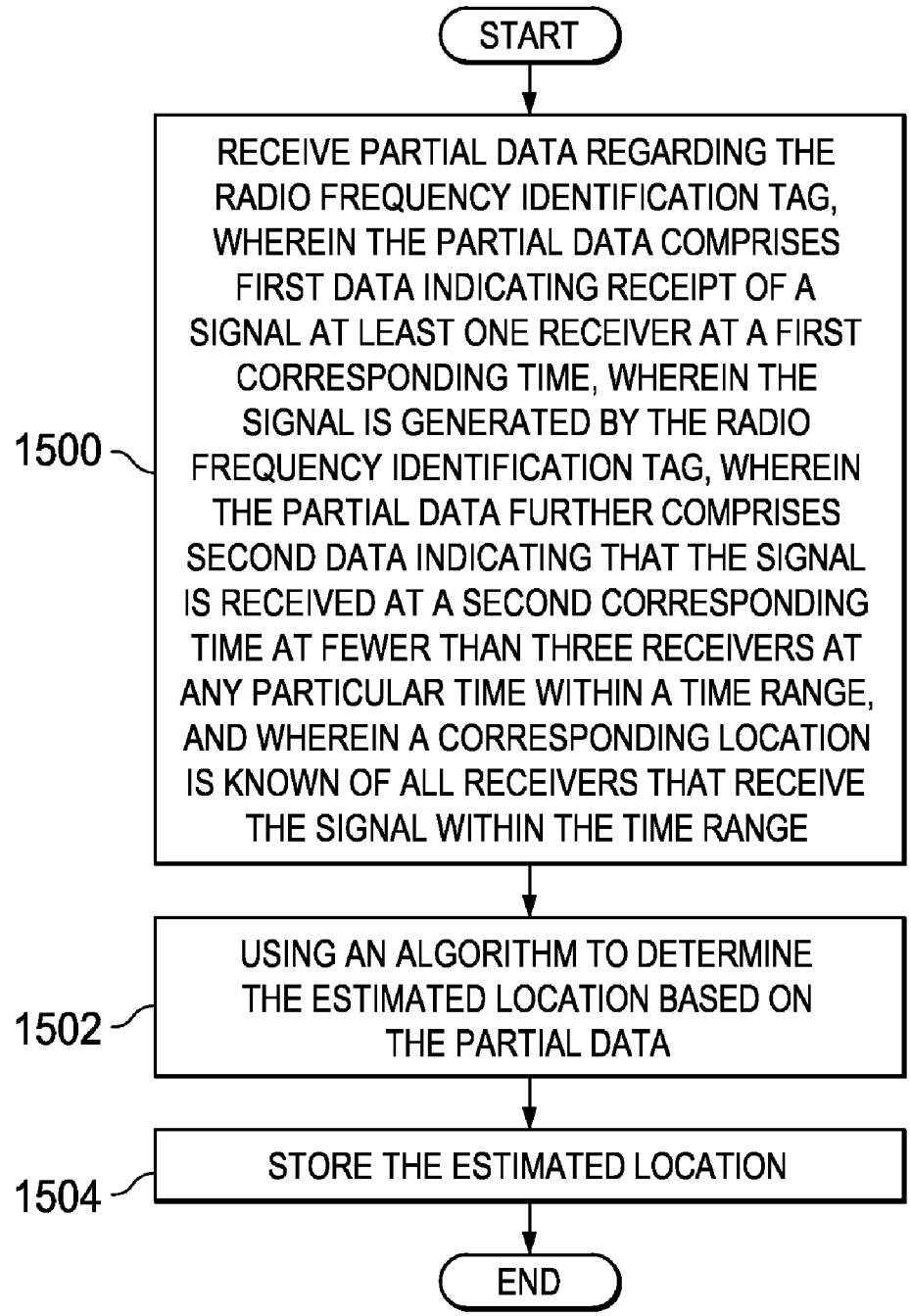
FIG. 15 is a flowchart of a process for locating a radio frequency identification tag in time and space using incomplete information, in accordance with an illustrative embodiment.

FIG. 15 is a flowchart of a process for locating a radio frequency identification tag in time and space using incomplete information, in accordance with an illustrative embodiment. The process shown in FIG. 15 can be implemented in a data processing system, such as servers 104 or 106 or clients 110, 112, or 114 in FIG. 1, or data processing system 200 shown in FIG. 2. The process shown in FIG. 15 can be implemented using the system shown in FIG. 8, using the algorithm described with respect to FIG. 8. The process shown in FIG. 15 can be implemented in a single processor of a single data processing system.

The process begins as the data processing system receives partial data regarding the radio frequency identification tag, wherein the partial data comprises first data indicating receipt of a signal at least one receiver at a first corresponding time, wherein the signal is generated by the radio frequency identification tag at a second corresponding time, wherein the partial data further comprises second data indicating that the signal is received at fewer than three receivers at any particular time within a time range, and wherein a corresponding location is known of all receivers that receive the signal within the time range (step 1500). The data processing system uses an algorithm to determine the estimated location based on the partial data (step 1502). The data processing system optionally then causes the estimated location to be stored (step 1504). The process terminates thereafter.

In another illustrative embodiment, the estimated location is an estimated present location. The estimated location can also be an estimated past location and an estimated future location. In another illustrative embodiment, the algorithm is a probabilistic predictive/regressive algorithm, such as that described with respect to FIG. 8.

In another illustrative embodiment, the partial data further includes video data. The video data indicates a second corresponding estimated location of the radio frequency identification tag at a second particular time. Thus, the process of using the algorithm can combine the video data with the other partial data described above to more accurately predict the location of a radio frequency identification tag in space-time. In illustrative embodiment, the second particular time is the corresponding time.

In another illustrative embodiment, the first data is third data indicating receipt of the signal at a first receiver at a first time, fourth data indicating receipt of the signal at a second receiver at the first time, fifth data indicating receipt of the signal at the second receiver at a second time, and sixth data indicating receipt of the signal at a third receiver at the second time. In this case, the second time is different than the first time and the first time and the second time are non-overlapping.

Additionally, various means for performing these steps can be provided. For example, a means for receiving can include any part of a data processing system that can receive data, including but not limited to a wireless receiver, a bus, a wired data link, a data processing system or any other means for receiving. In another example, a means for using an algorithm to determine the estimated location based on the partial data can include hardware or software for implementing the algorithm, such as, but not limited to, processors, firmware, and software.

Figure 16:
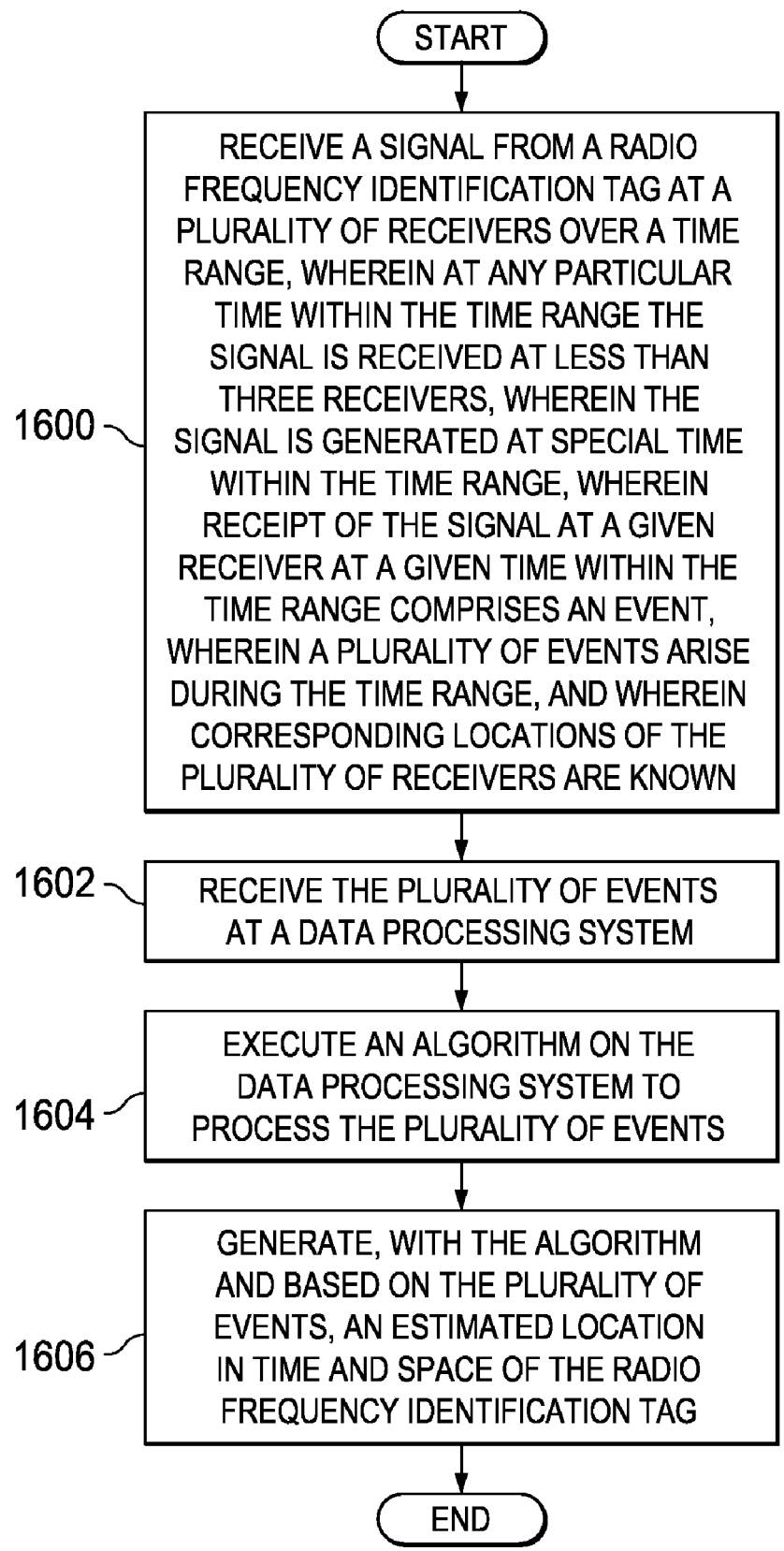
FIG. 16 is a flowchart of a process for locating a radio frequency identification tag in time and space using incomplete information, in accordance with an illustrative embodiment.

FIG. 16 is a flowchart of a process for locating a radio frequency identification tag in time and space using incomplete information, in accordance with an illustrative embodiment. The process shown in FIG. 16 can be implemented in a data processing system, such as servers 104 or 106 or clients 110, 112, or 114 in FIG. 1, or data processing system 200 shown in FIG. 2. The process shown in FIG. 16 can be implemented using the system shown in FIG. 8, using the algorithm described with respect to FIG. 8. The process shown in FIG. 16 can be implemented in a single processor of a single data processing system.

The process begins as a signal from a radio frequency identification tag is received at a plurality of receivers over a time range, wherein at any particular time within the time range the signal is received at less than three receivers, wherein the signal is generated at specific times within the time range, wherein receipt of the signal at a given receiver at a given time within the time range comprises an event, wherein a plurality of events arise during the time range, and wherein corresponding locations of the plurality of receivers are known (step 1600). The plurality of events is then received at a data processing system (step 1602). An algorithm is then executed on the data processing system to process the plurality of events (step 1604). The algorithm generates, based on the plurality of events, an estimated location in time and space of the radio frequency identification tag (step 1606).

In an illustrative embodiment, the generating step (step 1606) is further based on video data processed by the algorithm. In this case, the video data indicates a second corresponding estimated location of the radio frequency identification tag at a second particular time.

Figure 17:
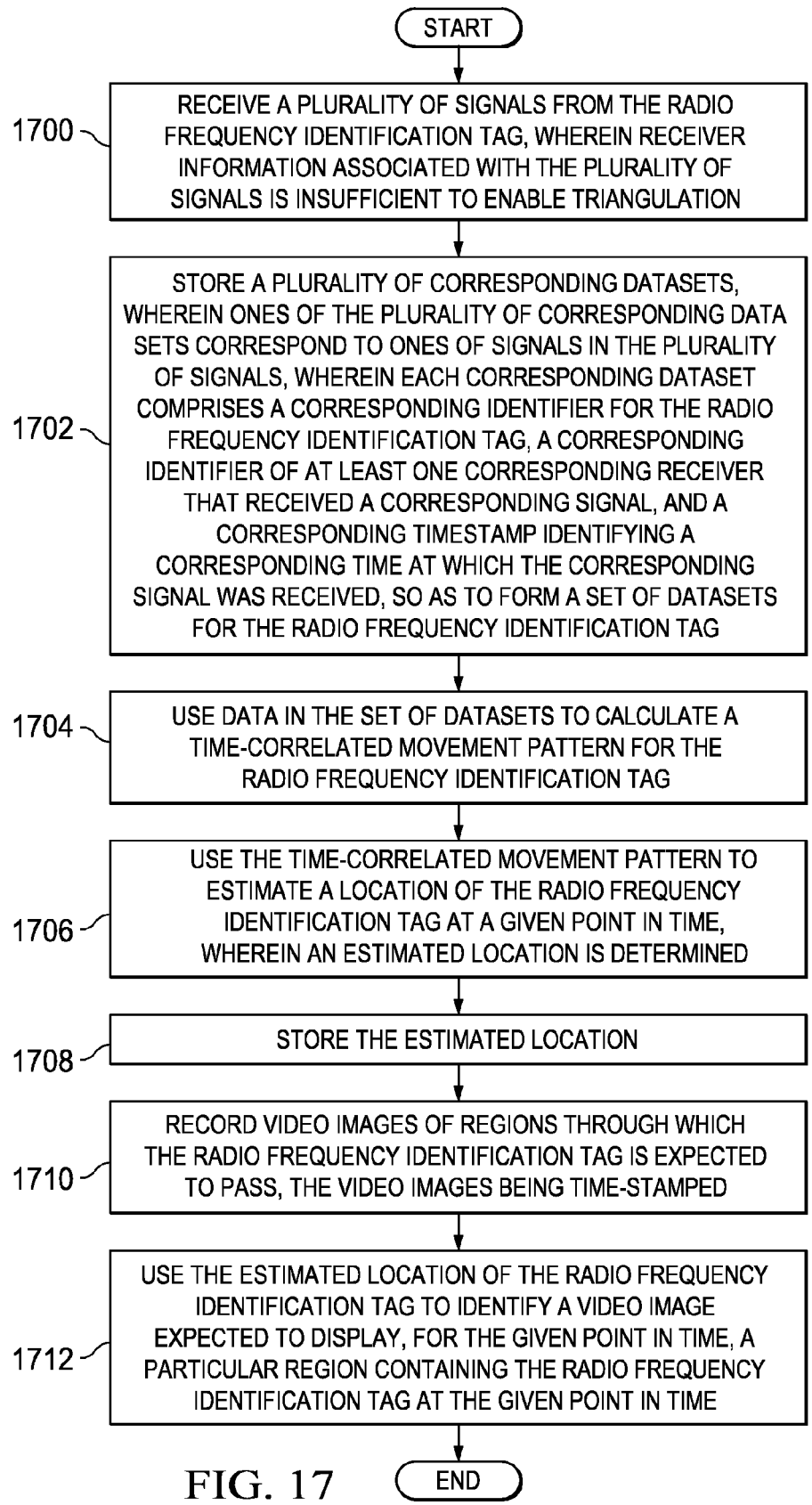
FIG. 17 is a flowchart of a process for locating a radio frequency identification tag in time and space using incomplete information, in accordance with an illustrative embodiment.

FIG. 17 is a flowchart of a process for locating a radio frequency identification tag in time and space using incomplete information, in accordance with an illustrative embodiment. The process shown in FIG. 17 can be implemented in a data processing system, such as servers 104 or 106 or clients 110, 112, or 114 in FIG. 1, or data processing system 200 shown in FIG. 2. The process shown in FIG. 17 can be implemented using the system shown in FIG. 8, using the algorithm described with respect to FIG. 8. The process shown in FIG. 17 can be implemented in a single processor of a single data processing system.

The process begins as the processor receives a plurality of signals from the radio frequency identification tag, wherein receiver information associated with the plurality of signals is insufficient to enable triangulation (step 1700). The processor then stores a plurality of corresponding datasets, wherein ones of the plurality of corresponding data sets correspond to ones of signals in the plurality of signals, wherein each corresponding dataset comprises a corresponding identifier for the radio frequency identification tag, a corresponding identifier of at least one corresponding receiver that received a corresponding signal, and a corresponding timestamp identifying a corresponding time at which the corresponding signal was received, so as to form a set of datasets for the radio frequency identification tag (step 1702).

The processor then uses data in the set of datasets to calculate a time-correlated movement pattern for the radio frequency identification tag (step 1704). The processor uses the time-correlated movement pattern to estimate a location of the radio frequency identification tag at a given point in time, wherein an estimated location is determined (step 1706). In an illustrative embodiment, the process can terminate at this point.

However, other illustrative embodiments can include additional steps in this process. For example, the processor can store the estimated location (step 1708). In another illustrative example, the processor can record video images of regions through which the radio frequency identification tag is expected to pass, the video images being time-stamped (step 1710). The processor can then use the estimated location of the radio frequency identification tag to identify a video image expected to display, for the given point in time, a particular region containing the radio frequency identification tag at the given point in time (step 1712). The process terminates thereafter.

For any of the illustrative methods described with respect to FIG. 17, the plurality of signals can be substantially temporally spaced from one another. The term "substantially temporarily spaced from one another" means that signals within the plurality of signals are received at different times such that an approximate temporal boundary exists between any two given signals.

Additionally, the step of using data in the set of datasets to calculate a time-correlated movement pattern for the radio frequency identification tag can include using data in a probabilistic predictive/regressive algorithm. An example of a probabilistic predictive/regressive algorithm is described with respect to FIG. 8.

FIG. 18 is a flowchart illustrating operation of a probabilistic predictive/regressive algorithm, in accordance with an illustrative embodiment. The process shown in FIG. 18 can be implemented in a data processing system, such as servers 104 or 106 or clients 110, 112, or 114 in FIG. 1, or data processing system 200 shown in FIG. 2. The process shown in FIG. 18 is an exemplary implementation of probabilistic predictive/regressive algorithm 818 shown in FIG. 8. The process shown in FIG. 17 can be implemented in a single processor of a single data processing system.

In the illustrative example of FIG. 18, the location of a radio frequency identification tag is estimated using a grid. The values in the squares of the grid contain the probability of the radio frequency identification tag being in that square at the specified time. Examples of these grids are shown in FIG. 9 through FIG. 14.

The process begins as the processor receives a first hit and then causes the hit to be subsequently saved (step 1800). A hit is a receipt of a radio frequency identification tag signal at a radio frequency identification transceiver. Each hit is stored in a database, with each hit record containing a number for a corresponding radio frequency identification tag, the time of the hit, and a location grid associated with the hit.

When a hit is first received and saved, such as at the time of receipt of full signal 804 in FIG. 8, a new record is inserted into the database. The location grid is used to hold all of the possible locations of that tag. In an illustrative example, the location grid for the first hit could be the location grid shown in FIG. 9.

Next, the processor searches a database for a second hit with the same radio frequency identification tag number (step 1802). The database can be storage 822 of FIG. 8. The processor then determines whether additional hits are found (step 1804). If no additional hits are found, then the process terminates. However, if a second (past) hit is found, then the processor reads the existing record (step 1806). The second hit can be past signal 814 of FIG. 8. A second record associated with second hit is retrieved. The second record is associated with a location second grid, which can be the location grid shown in FIG. 11.

The processor then determines a time difference between the first hit and the second hit (step 1808). The processor uses this time difference to create two new location grids. In this illustrative example, the processor creates a first new location grid based on the first grid (step 1810) and the processor also creates a second new location grid based on the second grid (step 1812). In an illustrative example, the first new location grid is shown in FIG. 10 and the first grid is shown FIG. 9. Similarly, the second new location grid is shown in FIG. 12 and the second grid is shown in FIG. 10.

The processor then combines the first grid and the second new location grid (step 1814) to create a third grid. Similarly, the processor also combines the first new location grid and the second grid (step 1816) to create a fourth grid. In an illustrative example, the graph shown in FIG. 10 is combined with the graph shown in FIG. 11 to create a first combined grid, which can be the graph shown in FIG. 13. FIG. 13, as described above, is the probability map for the location of the radio frequency identification tag at the time full signal 804 of FIG. 8 is received. The processor then determines a best location and probability for the radio frequency identification tag (step 1818) based on the first combined grid. The highest probability in FIG. 13 is at location (15,18). Similarly, the graph shown in FIG. 12 is combined with the graph shown in FIG. 9 to create a second combined grid, which can be the graph shown in FIG. 14. FIG. 14, as described above, shows the probability map for the location of the radio frequency identification tag at the time past signal 814 of FIG. 8 was received. The processor also determines a best location and probability for the radio frequency identification tag (step 1820) for the second combined grid. The highest probability in FIG. 14 is at location (7,22).

The processor determines whether a single high probability peak exists for the first combined grid (step 1822) and whether a single high probability peak exists for the second combined grid (step 1824). In the illustrative examples described herein, the single peaks do exist at location (15,18) of FIG. 13 and location (7,22) of FIG. 14.

For both determinations, if the result of the determination is "yes," then the processor can find images of the radio frequency identification tag using times and locations (step 1826). In an illustrative example, images generated by cameras pointed at the two predicted locations (15,18) and (7,22) at the corresponding times the signals were generated can be retrieved. The processor can then display these images (step 1828) in order to confirm the presence of the physical item associated with the radio frequency identification tag. Instead of displaying the images, the processor can identify that the object in question exists in the image and use this information to predict a past location of the object. Given this information, the processor can also predict a future location of the object.

The processor then attempts to move to a next hit, assuming such a hit exists (step 1830). The processor can also attempt to move to a next hit, assuming such a hit exists, in the case of a "no" determination from one or both of the determinations in steps 1822 and 1824. The process then returns to step 1804 and repeats. Note that if a new hit is found, then the process repeats in order to further refine the estimated past, present, or future location of the radio frequency identification tag (a "yes" determination at step 1804). However, if a new hit is not found (a "no" determination at step 1804), then the process terminates.

Thus, in another illustrative example, three sample hits exist. A first sample can be compared against a second sample and then against a third sample, in order to estimate a location for a first time. The second sample can also be compared against the first sample and then against the third sample in order to estimate a location of the radio frequency identification tag at a second time. The third sample can also be compared against the first sample and then against the second sample in order to estimate a location of the radio frequency identification tag at a third time.

Thus, the aspects of the present invention provide for a computer implemented method, apparatus, and computer usable program code for locating a radio frequency identification tag in time and space using limited information. In particular, the aspects of the present invention provide for a computer implemented method, apparatus, and computer usable program code for estimating, using an algorithm, a location of a radio frequency identification tag when, at any given time, less than three receivers receive a signal from the radio frequency identification tag. In other illustrative embodiments, video data that independently verifies a location of a radio frequency identification tag can be used by the algorithm in conjunction with the other limited information to more accurately estimate a location of the radio frequency identification tag in the past, present, or future.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for estimating a location of a radio frequency identification tag using incomplete information, the method comprising:

receiving a plurality of signals from the radio frequency identification tag, wherein receiver information associated with the plurality of signals is insufficient to enable triangulation;

storing a plurality of corresponding datasets, wherein ones of the plurality of corresponding data sets correspond to ones of signals in the plurality of signals, wherein each corresponding dataset comprises a corresponding identifier for the radio frequency identification tag, a corresponding identifier of at least one corresponding receiver that received a corresponding signal, and a corresponding timestamp identifying a corresponding time at which the corresponding signal was received, so as to form a set of datasets for the radio frequency identification tag;

using data in the set of datasets to calculate a time-correlated movement pattern for the radio frequency identification tag;

using the time-correlated movement pattern to estimate a location of the radio frequency identification tag at a given point in time, wherein an estimated location is determined; and storing the estimated location.

2. The computer-implemented method of claim 1, further comprising:

recording video images of regions through which the radio frequency identification tag is expected to pass, the video images being time-stamped; and using the estimated location of the radio frequency identification tag to identify a video image expected to display, for the given point in time, a particular region containing the radio frequency identification tag at the given point in time.

3. The computer-implemented method of claim 1, wherein the plurality of signals are substantially temporally spaced from one another.

4. The computer-implemented method of claim 1, wherein using data in the set of datasets to calculate a time-correlated movement pattern for the radio frequency identification tag comprises using data in a probabilistic predictive/regressive algorithm.

* * * * *